United States Patent
Ishiguro et al.

(10) Patent No.: US 7,481,449 B2
(45) Date of Patent: Jan. 27, 2009

(54) AIRBAG DEVICE FOR DRIVER'S SEAT

(75) Inventors: Naohiko Ishiguro, Aichi-ken (JP); Hitoshi Iida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 619 days.

(21) Appl. No.: 11/224,294

(22) Filed: Sep. 13, 2005

(65) Prior Publication Data
US 2006/0055157 A1    Mar. 16, 2006

(30) Foreign Application Priority Data
Sep. 14, 2004  (JP)  ............................ 2004-267171
Mar. 16, 2005  (JP)  ............................ 2005-075452

(51) Int. Cl.
B60R 21/16    (2006.01)
(52) U.S. Cl. .................................... 280/731; 280/743.1
(58) Field of Classification Search ................ 280/731, 280/728.1, 743.1
See application file for complete search history.

(56) References Cited

U.S. PATENT DOCUMENTS 6,557,891 B2 * 5/2003 Okada et al. ............. 280/743.1

2003/0222434 A1 * 12/2003 Okada et al. ............. 280/728.1

FOREIGN PATENT DOCUMENTS

| JP | A-H11-48890 | 2/1999 |
| JP | A-2003-170804 | 6/2003 |
| JP | CN-1437537 A | 8/2003 |

OTHER PUBLICATIONS

Office Action dated Nov. 24, 2006 from Chinese Patent Office for corresponding Chinese application No. 2005-101026442.

* cited by examiner

Primary Examiner—Eric Culbreth
(74) Attorney, Agent, or Firm—Posz Law Group, PLC

(57) ABSTRACT

An airbag of an airbag device for the driver's seat of the invention is stored in a way that a carbody-side wall part and a driver-side wall part are overlapped and spread flat, and the airbag is folded in three steps so that widths between opposing outer edge portions with a gas opening as the center are reduced. In the first step of the folding, the carbody-side wall part and the driver-side wall part are overlapped and spread flat, and then right and left edge portions are folded toward the carbody-side wall so that wound regions are provided. In the second step of the folding, areas by front and rear edge portions are folded toward the driver-side wall, so that two regions that have been folded each cover approximately half the gas opening. In the third step, areas by the right and left edge portions that have been folded in the second step are folded in such a manner as to be bent upward. The airbag device for the driver's seat of the invention can secure thickness of the neighborhood of a center of the airbag in the initial stage of expansion of the airbag.

9 Claims, 16 Drawing Sheets

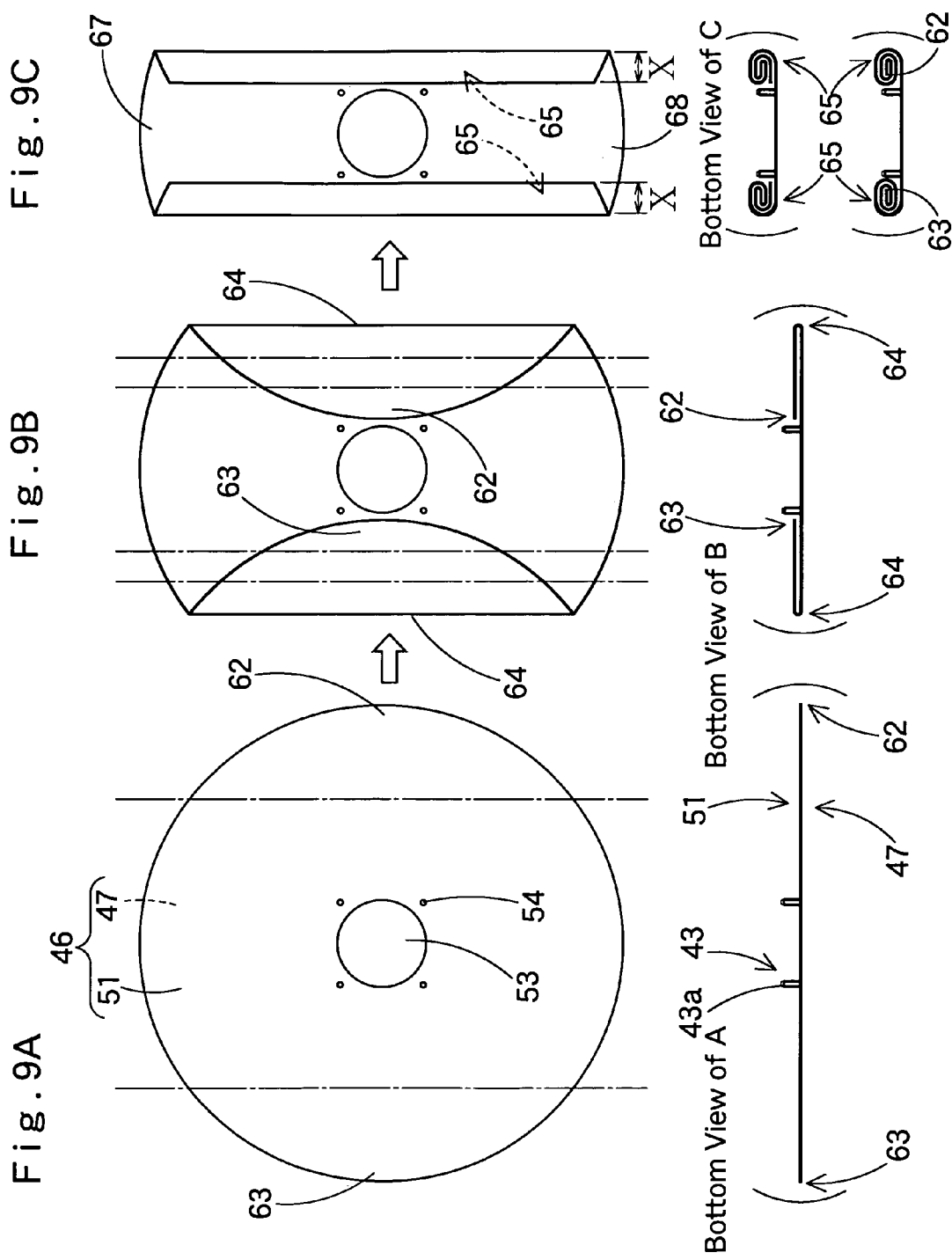

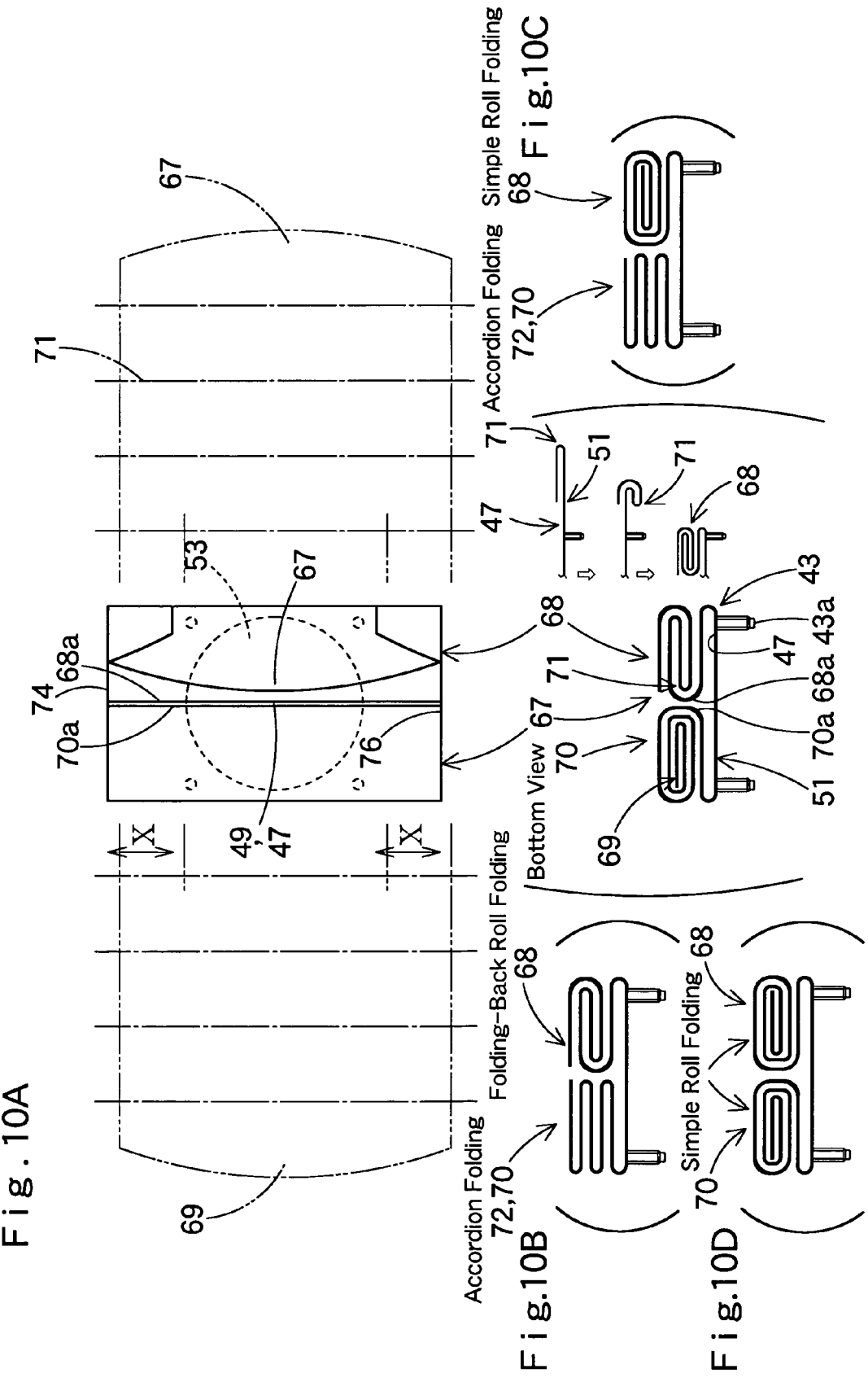

After Insertion of inflator

Bottom View

AIRBAG DEVICE FOR DRIVER'S SEAT

The present application claims priority from Japanese Patent Application No. 2004-267171 of Ishiguro et al., filed on Sep. 14, 2004, and Japanese Patent Application No. 2005-075452 of Ishiguro et al, filed on Mar. 16, 2005, the disclosures of which are hereby incorporated into the present application by reference.

BACKGROUND OF THE INVENTION

1. Field of the Invention

The present invention relates to an airbag device for the driver's seat for expanding an airbag so that a driver can be protected during a collision of a vehicle, wherein the airbag device for the driver's seat is mounted by the upper part of a boss of the center of the steering wheel.

2. Description of Related Art

In a conventional airbag device for a driver's seat described in JP-A-2003-170804, an airbag is stored in a folded condition by the upper part of a boss of the center of a steering wheel. Furthermore, the stored airbag is held by a bag holder and covered with an openable door part of an airbag cover.

The airbag comprises a driver-side wall part disposed toward the driver at a top side when expansion is completed, and a carbody-side wall part at the lower side of the airbag facing the steering wheel. Both the driver-side wall part and the carbody-side wall part are in an approximate disk shape. The airbag is formed by coupling the outer edges of the driver-side wall part and the carbody-side wall part to each other. In the airbag, a gas opening is disposed near the center of the carbody-side wall part, and the periphery of the gas opening is made the attachment region to the bag holder. An inflator that can supply expansion gas is inserted into the gas opening.

The airbag is stored in a way that when it is folded, first, the carbody-side wall part and the driver-side wall part are overlapped and spread flat, and then folded so that widths between sides of the outer peripheries in a diameter direction with the gas opening as the center is reduced. When the expansion gas is supplied, the airbag pushes and opens the door part, and then expands.

Furthermore, in the conventional airbag device for the driver's seat, the folding process of the airbag for reducing the widths was performed in at least two stages where the directions in which the size is reduced are perpendicular to each other. In the folding process of the first stage, areas by two edge portions are folded toward the driver-side so as to overlap.

Therefore, when the airbag spreads and expands, unfolding of the folding of the first-step was restricted due to friction between lapped regions in the first-stage. Unfolding of the folding of the second stage was performed quickly at all positions. As a result, the airbag was able to spread out in a predetermined direction (the lateral direction of the unfolding of the folding in the second-stage) when unfolding the folding of the second stage.

Thus, the folding had an advantage over the folding as described in JP-A-11-48890 in that the airbag can be spread and expanded in a manner such that unnecessary projection toward the driver is restricted. In addition, a certain level of thickness is secured, and spreading width in a predetermined direction can be secured in the initial stage of expansion of the airbag. However, in conventional folding as described in JP-A-11-48890, the areas by two edge portions of an airbag that was spread flat were simply wound up toward the driver-side wall and brought close to a gas opening side.

The conventional airbag device for driver's seat described in JP-A-2003-170804 has regions which overlap in the folding process of the first-step. The overlapping regions are disposed above the gas opening, and therefore unfolding of these regions is delayed. Therefore, in the initial stage of expansion of the airbag, the thickness of a region of the airbag over the gas opening, in other words, the region near the center of the airbag when the expansion is completed or the region of the airbag near the center of the steering wheel, is small. Therefore, there has been room for improvement in the conventional airbag device for the driver's seat with regard to securing thickness in the initial stage of expansion near the portion which will be the center when expansion of the airbag is completed.

SUMMARY OF THE INVENTION

The present invention solves the above problem and is intended to provide an airbag device for the driver's seat in which thickness near the center of the airbag can be secured in the initial stage of expansion of the airbag.

The airbag device for the driver's seat according to the present invention is disposed in the upper part of a boss of the center of the steering wheel. The airbag device for the driver's seat of the present invention has an airbag, an inflator, a bag holder, and an airbag cover. The airbag is stored in a folded state and expands when expansion gas is supplied. The inflator supplies the expansion gas into the airbag. The bag holder holds the folded airbag. The airbag cover covers the folded airbag and has a door part that opens when pushed by the airbag which is expanding. Furthermore, the airbag has a driver-side wall part disposed at its top side when expansion is completed and a carbody-side wall part disposed on its bottom side, both of which have an approximately disk shape. The airbag is formed by coupling the edges of the driver-side wall part and the carbody-side wall part to each other. The carbody-side wall part has a gas opening for inserting the inflator near the center, and the periphery of the gas opening is made the attachment region to the bag holder. Furthermore, the airbag is configured to be stored by overlapping the carbody-side wall part and the driver-side wall part spread flat and folding them so that the width between opposing edge portions with the gas opening as the center is reduced. Furthermore, the airbag is stored in the upper part of the boss through three folding steps: a first step described below, a second step for reducing the width in a direction perpendicular to that of the first step, and a third step for reducing the width in the same direction as the first step.

The above first step is a step in which the carbody-side wall part and the driver-side wall part are overlapped and spread flat, and areas by two opposing edge portions with the gas opening as the center are folded so that they are brought close to the gas opening at the side toward the car body, such that wound regions are provided and folding allowances for the third step remain. The second step is a step in which the opposing edge portions with the gas opening as the center are folded so that they are brought close to the gas opening at the side toward a driver, the two folded portions each covering approximately half of the gas opening. Furthermore, the third step is a step in which areas by the opposing edge portions with the gas opening as the center are folded so that they are bent at the upper side wall toward the driver-side so that they can be disposed near the inflator inserted through the gas opening at two sides.

In the airbag device for the driver's seat according to the present invention, when the expansion gas is supplied from the inflator into the stored airbag, the airbag folds are unfolded, and the airbag expands in a process that reverses the folding process with the region near the center of the driver-side wall facing the gas opening being pushed up. Thus, in the initial stage of the expansion of the airbag, the pushing-up of the center of the driver-side wall works to unfold the folding done in the third step and then to erase the folding line created in the second step.

At that time, in the folding in the third step, areas by the opposing edge portions with the gas opening as the center are simply bent to the upper side of the driver-side wall, so that they are disposed near two sides of the inflator inserted through the gas opening. Therefore, the fold is easily unfolded when the bent region is stretched, and the rising of the region at the center of the driver-side wall part is accelerated.

In the second step, the folding is such that opposing edge portions are brought close to the upper side of the gas opening in a direction perpendicular to the width which was reduced in the third step (first step), so that they each cover approximately half of the gas opening. Therefore, if the folding in the third step is unfolded, the region near the center of the driver-side wall part is easy to push upward from the space between two edge portions close to the gas opening. As a result, the folding in the second step is quickly unfolded as the region near the center of the driver-side wall part is pushed up.

Particularly, in the folding in the first step, areas by two edge portions located along a predetermined direction are folded, incorporating a portion that is rolled up at the side of the carbody-side wall. Then, unfolding of the fold of the first step is prevented by the wound-up region. Therefore, in unfolding of the fold in the second step, the folding of the first step is not unfolded, and conversely, unfolding of the fold in the second step is accelerated until the airbag has the shape it had immediately before it was folded in the second step. As a result, the airbag expands into the shape it has immediately before it is folded in the second step or widely spreads along a direction in which the width was reduced in the second step with the region near the center of the driver-side wall part being projected upward. Naturally, at that time, since the unfolding of the fold of the first step is prevented, the region near the center of the driver-side wall part does not project excessively to the driver side.

Then, after the initial stage of the expansion, the unfolding of the fold that is folded in the first step is performed, and the expansion of the airbag is completed.

Accordingly, in the airbag device for the driver's seat according to the present invention, in the initial stage of the expansion of the airbag, the region near the center of the driver-side wall part smoothly projects upward with unfolding of the fold in the third step or the second step. Therefore, the airbag in the initial stage of the expansion can secure thickness near the center, and can smoothly protect the head of the driver even if the head hits the center of the steering wheel.

Furthermore, in the initial stage of the expansion, the airbag expands while spreading along the direction in which the width was reduced in the second step. Therefore, if the width reduction direction in the second step is made to be along, for example, the longitudinal direction of a vehicle, in the initial stage of the expansion of the airbag, the airbag can be expanded along the longitudinal direction only, although the width in the lateral direction is small. Then, the airbag in the initial stage of the expansion can easily protect regions of the head and the chest of the driver, first extending along the vertical direction and then forwardly displaced to be in the longitudinal direction, by its cushion effect.

Naturally, in the airbag device for the driver's seat according to the present invention, after the driver-side and carbody-side wall parts are overlapped flatly, the airbag is folded so that width reduction in the second step is perpendicular to width reduction in the first and third steps. Furthermore, in the second step, the two edge portions along a predetermined direction are folded to the gas opening so that each side covers approximately half of the gas opening. Furthermore, in the third step, areas by two edge portions along a direction perpendicular to the direction of width reduction in the second step are bent so that the sides become top endface sides close to each other, and thereby the folding is completed. Therefore, the airbag can be folded compactly in an approximately rectangular shape. As a result, in the airbag device for the driver's seat according to the present invention, the folded airbag can be smoothly stored by the upper part of the boss of the steering wheel, in which a storing space is limited in order to secure visibility of meters in an instrument panel.

Furthermore, in the airbag device for the driver's seat according to the present invention, in the third step, the opposing edge portions with the gas opening as the center are bent to the upper side toward the driver so that they are disposed near opposite sides of the inflator which will be inserted through the gas opening. Thus, in the third step, the edge portions are bent over so that they lie over the folded-up regions and so that during insertion of the inflator the bent portions are extended to be vertical. Therefore, when the airbag that has been folded is attached to a bag holder, the airbag cover is put on, and then the inflator is inserted through the gas opening into the airbag and attached to the bag holder. The inflator can be smoothly inserted between the bent regions formed in the third step causing the bent regions to extend vertically, whereby the airbag device can be assembled with minimum disruption of the folded configuration of the airbag. Additionally, even if the folded configuration of the airbag is disrupted by the insertion of the inflator into the gas opening, since the center region of the driver-side wall part is pushed up at the insertion of the inflator, the thickness near the center of the driver-side wall part is secured in the initial stage of the expansion of the airbag of the present invention. As a result, management of disrupted folds of the airbag during assembly of the airbag device can be reduced.

In other words, such a storing condition of the airbag is a condition where the airbag is stored in a manner that the bent regions lying on the driver-side wall side of the folded up portions, which were folded in the third step, are arranged so that they extend in a vertical direction between the airbag cover and the bag holder, on opposite sides of the inflator.

In an example of the first step of the folding process of the airbag, the carbody-side wall part and the driver-side wall part are overlapped and spread flat. Two opposing edge portions with the gas opening as the center are folded back to the carbody-side wall, and the areas defined by these folding lines are wound up.

Alternatively, the first step in the folding process of the airbag may comprise folding wherein the carbody-side wall part and the driver-side wall part are overlapped and spread flat. The two opposing edge portions with the gas opening as the center are rolled up toward the carbody-side wall.

Furthermore, at least one of the sides which covers approximately half of the gas opening in the folding of the airbag in the second step can be folded according to any one of the following three folding methods.

In the first method, both of the opposing edge portions with the gas opening as the center are provided with folding lines between the gas opening and the edge portions, in order to facilitate folding of the edge portions toward the driver-side wall. After folding, neighborhoods of the folding lines are made the ends from which the airbag is wound up toward the carbody-side wall and then folded so as to lie on the driver-side wall.

Second, opposing edge portions with the gas opening as the center are rolled up toward the carbody-side wall and then folded so that they lie on the driver-side wall.

Third, opposing edge portions with the gas opening as the center are accordion-folded so that portions overlap toward the driver-side wall.

The two sides that each cover approximately half of the gas opening through the folding of the airbag in the second step may be folded in different ways or folded in the same way.

Furthermore, in an initial step, the airbag is folded such that certain widths are left to be folded in a final step, and then the remaining portions are folded back to finish the folding step. The airbag is folded leaving widths to be folded back in the final step and in the second step, as well as in the first step. That is, the airbag is folded, before being housed on top of the boss, in three steps: a first step, a second step for reducing a width in a direction perpendicular to the first step, and a final step in which the widths are reduced in the same direction as in the first step and second step.

In the first step, the carbody-side wall part and the driver-side wall part are overlapped and spread flat, and then opposing edge portions with the gas opening as the center are folded toward the carbody-side wall so as to be brought close to the gas opening, such that certain widths are left unfolded to be folded in the final step. In the second step, opposing edge portions with the gas opening as the center are brought close to the gas opening on the carbody-side wall. In the second step, too, certain widths are left unfolded to be folded in the final step. In the final step, portions left unfolded in the first and second steps are folded in such a manner as to be bent upward toward the driver-side wall.

In the airbag device thus constructed, when expansion gas is supplied from the inflator into the stored airbag, the airbag unfolds its folds, and spreads and expands in a reverse process to the folding process with a neighborhood of the center of the driver-side wall part facing the gas opening being pushed up. That is, in an initial stage of airbag expansion, the neighborhood of the center of the driver-side wall part opens up the folds made in the final step and then the folds made in the second step, while being pushed up.

The folding in the final step is simply bending each of edge portions upward toward the driver-side wall. Accordingly, when the folds made in the final step are unfolded, the neighborhood of the center of the driver-side wall part easily rises upward since this portion is exposed in a generally square shape with folded-up portions made in the second step stayed on the carbody-side wall. Consequently, the folds made in the second step are swiftly unfolded along with the rise of the neighborhood of the center of the driver-side wall part.

The airbag is formed into a shape right before it is folded in the second step while the neighborhood of the center of the driver-side wall part is being projected upward. In other words, the airbag widely expands along the direction in which width was reduced in the second step.

Then, after the initial stage of the expansion, the folds made in the first step are unfolded, so that the expansion of the airbag is completed.

Accordingly, in the airbag device for the driver's seat constructed as above during the initial stage of airbag expansion, the neighborhood of the center of the driver-side wall part smoothly projects upward along with the unfolding of the folds made in the final step or the second step. Therefore, in the initial stage of the expansion, the airbag secures enough thickness in its center vicinity, so that, even if a neighborhood of the driver's head enters a neighborhood of the center of the steering wheel, the airbag smoothly protects the neighborhood of the driver's head.

BRIEF DESCRIPTIONS OF DRAWINGS

FIGS. 9A, 9B and 9C are views sequentially illustrating a first step of the folding of the airbag of the embodiment;

FIG. 10A is a view illustrating a second step of the folding of the airbag of the embodiment; and furthermore FIGS. 10B, 10C and 10D are views for illustrating modifications of the folding;

FIG. 11C is a bottom view showing a condition that an inflator is inserted after that;

DESCRIPTION OF THE PREFERRED EMBODIMENTS

Figure 1:
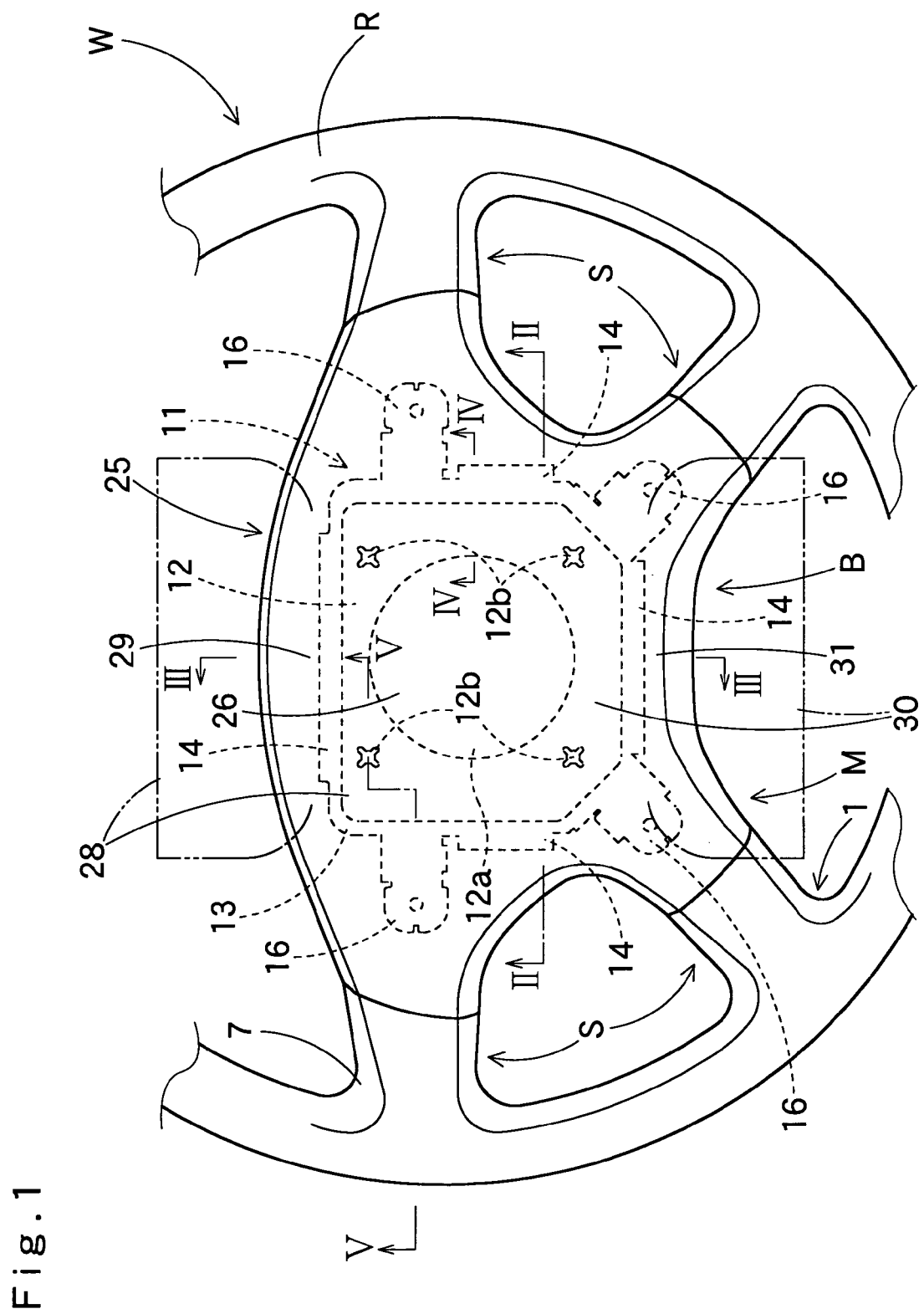
FIG. 1 is a partial plan view of a steering wheel mounted with an airbag device for the driver's seat of an embodiment of the invention.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

An airbag device for the driver's seat M of an embodiment is disposed in a steering wheel W as shown in FIG. 1 to FIG. 5. The steering wheel W has a circular ring part R that is held during steering, a boss B disposed at the center of the ring part R, and four spoke parts S for connecting the ring part R with the boss B. The airbag device M is disposed by the upper part of the boss B.

The steering wheel W comprises the airbag device M and a steering wheel body 1 other than the device.

Up-and-down, longitudinal, and right-and-left directions in the specification refer to the state where the steering wheel W having the airbag device M is mounted in a vehicle, up-and-down being the direction along the steering shaft SS to which the steering wheel W is attached. Longitudinal is the direction perpendicular to a shaft of the steering shaft SS which conforms to the movement the vehicle being steered straight forward, and the right-and-left is the direction perpendicular to the shaft of the steering shaft SS extending to the right and the left of the vehicle.

The steering wheel body 1 includes a core bar 2, a covering layer 7 and a lower cover 8. The core bar 2 is disposed in the ring part R, boss B, and spokes S, and includes a ring part core-bar portion 3 disposed in the ring part R, spoke part core-bar portions 4 disposed in each of the spoke parts S, and a boss core-bar portion 5 disposed in the boss part B. The covering layer 7 is made from synthetic resin, and covers the ring part core-bar portion 3 and portions of the spoke part core-bar portions 4 proximate to the ring part R, in the core-bar 2. The lower cover 8 is made from synthetic resin for covering a bottom side of the steering wheel body 1. The boss part core-bar 5 has a boss 5a connected to the steering shaft SS and a covering part 5b for covering the periphery of the boss 5a. In the core-bar 2, while the boss 5a is made of steel, the covering part 5b, spoke part core-bar 4, and ring part core-bar 3 are made of a die casting alloy of light metals such as aluminum, which are integrally cast.

The airbag device M comprises an airbag 46 which is folded and stored; an inflator 41 for supplying expansion gas into the airbag 46; a pad 25 as an airbag cover for covering the folded airbag 46; a bag holder 11 for holding the airbag 46, inflator 41, and pad 25; and two connecting plates 23. The connecting plates 23 are disposed on either side of the airbag device M, and each are connected to the bag holder 11 via horn switches 19. The connecting plates 23 connect the airbag device M to the steering wheel body 1.

The inflator 41 comprises an approximately cylindrical body part 41a having gas discharge ports 41b at the upper side and a flange part 41c provided around the outer circumference of the body part 41a. In the flange part 41c, through-holes 41d are formed for insertion of bolts 43a of a retainer 43 (see FIG. 5).

Figure 5:
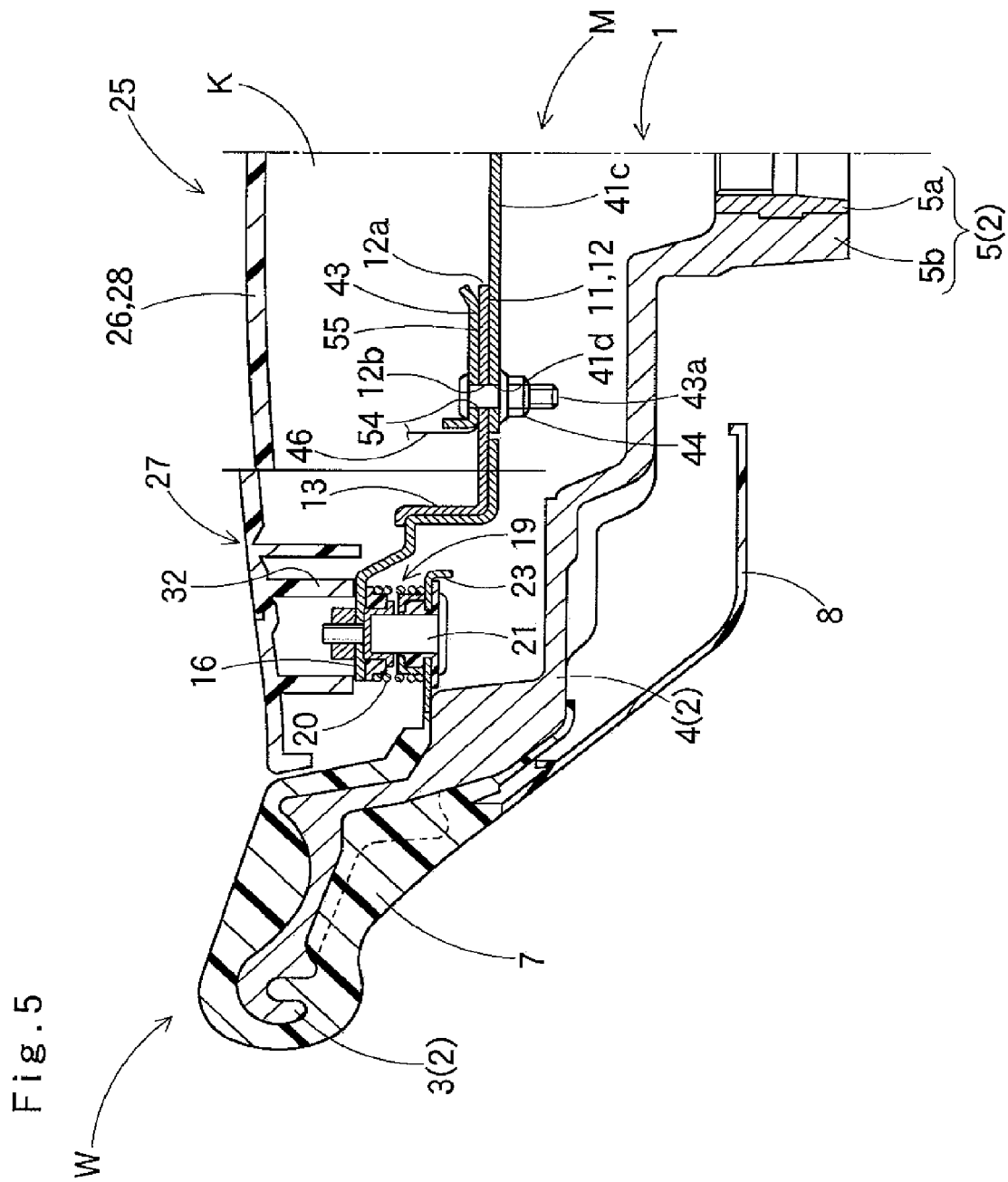
FIG. 5 is a schematic section view of the airbag device of the embodiment shown in FIG. 1, taken along line V-V of FIG. 1.

The bag holder 11 is formed by coupling plural sheets of sheet metal using welding or caulking. The bag holder 11 has a bottom wall part 12 in an approximately rectangular plate shape, and a tubular sidewall part 13 extending upward from the edge of the bottom wall part 12. At the center of the bottom wall part 12, an insertion hole 12a as a circular opening for insertion of the body part 41a of the inflator 41 from below is formed. As shown in FIGS. 1 and 5, four through-holes 12b are formed around the insertion hole 12a. Respective bolts 43a of the retainer 43 for attaching the airbag 46 to the bottom wall part 12 are inserted into the respective through-holes 12b.

Figure 4:
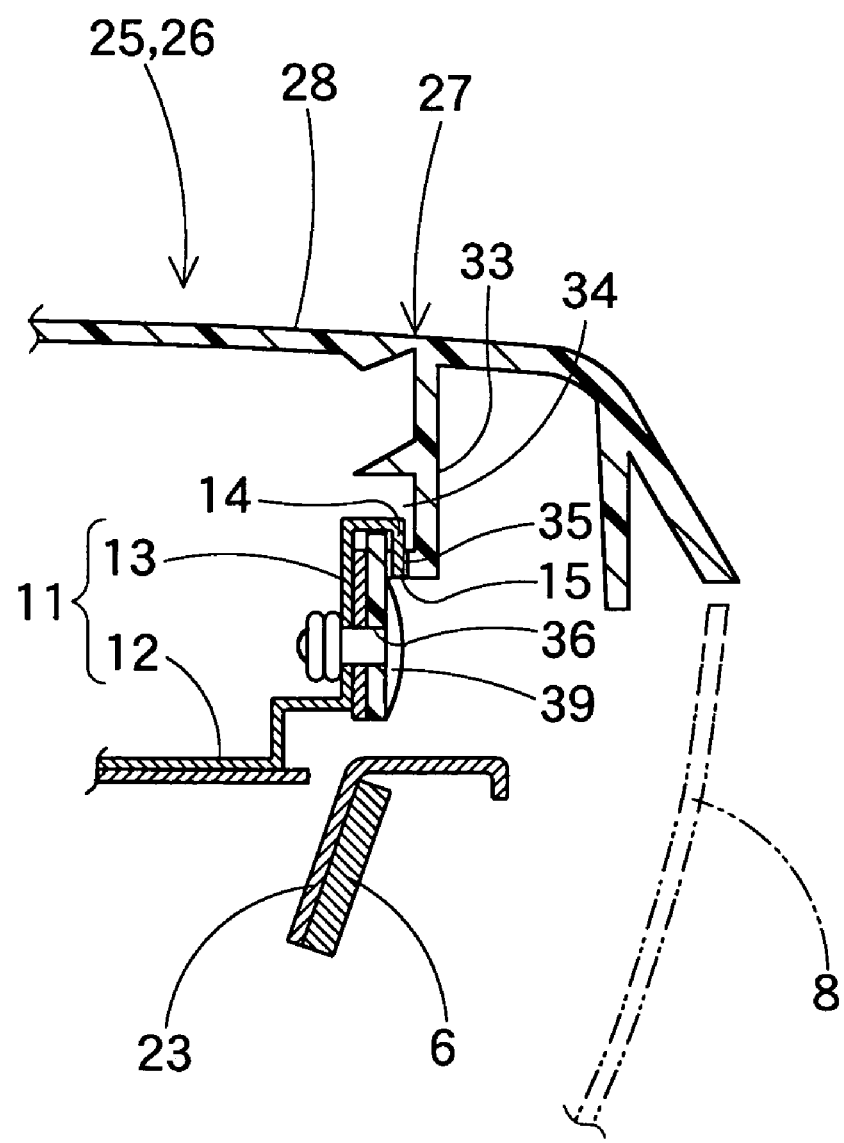
FIG. 4 is a schematic section view of the airbag device of the embodiment shown in FIG. 1, taken along line IV-IV of FIG. 1.

The bag holder 11 has latching claws 14, which bend downward, at front and rear and right and left locations of the upper edge of the sidewall part 13. Each of the latching claws 14 is inserted into a latching groove 34 of the sidewall part 33 of the pad 25, and thus latches the sidewall part 33. Furthermore, as shown in FIG. 4, latching projections 15 which are inserted into latching holes 35 of the pads 25 are formed on the right and left latching claws 14.

Furthermore, as shown in FIGS. 1 and 5, connection strip parts 16 are arranged near four corners of the sidewall part 13 of the bag holder 11 so as to project outward. Horn switches 19 are attached to the bottom sides of the connection strip parts 16 using bolts 21.

Figure 2:
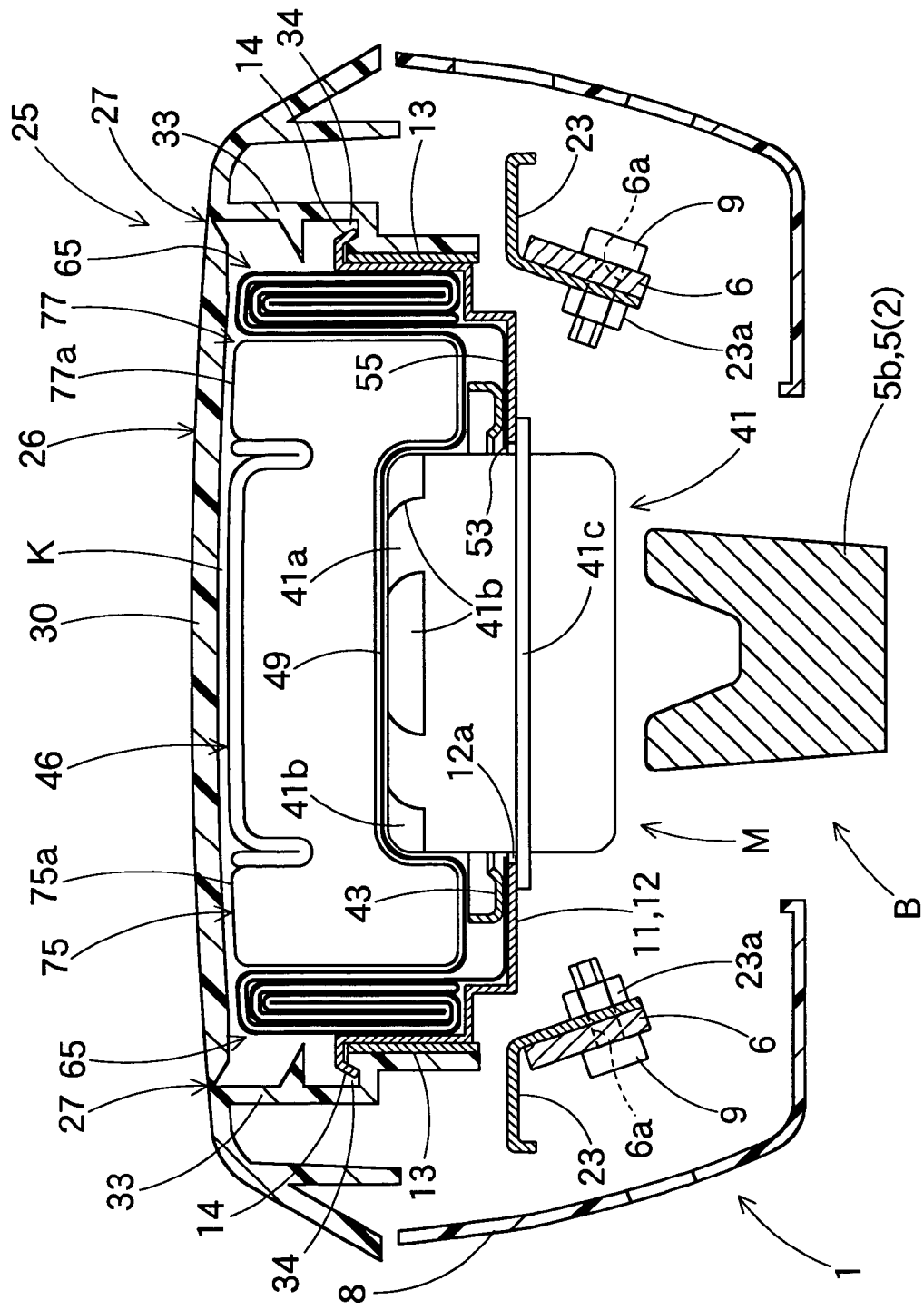
FIG. 2 is a schematic section view of the airbag device of the embodiment shown in FIG. 1, which corresponds to a region II-II of FIG. 1.

A front-and-rear pair of horn switches 19 on both right and left sides are held to each other at their bottom sides by the connecting plate 23. Respective right and left connecting plates 23 are arranged so that they extend in the front-rear direction of the steering wheel W. The bottom sides of the front and rear ends of connecting plates 23 are supported by two spoke-part core-bars 4 on both sides in the steering wheel body 1. Moreover, respective connecting plates 23 are attached on attachment bases 6 of the steering wheel body 1 at the center portion in the front-rear direction as shown in FIG. 2. Left and right attachment bases 6 connect between the front and rear spoke-part core-bars 4 at the left and right portions of the steering wheel body 1. Nuts 23a are bonded to the center regions in the front-rear direction of the connecting plates 23. The connecting plates 23 are fixed to the steering wheel body 1 by attachment bolts 9 which are threaded through threading holes 6a of the attachment bases 6 and held by the nuts 23a. The airbag 46, inflator 41, and pad 25 are held by the bag holder 11, and the bag holder 11 is fixed to respective connecting plates 23 with bolts 21. As a result, the airbag device M is attached to the steering wheel body 1 by fastening the bolts 9.

Pressing ribs 32 of the pad 25 contact the top sides of connecting strip parts 16. Therefore, if the pad 25 is pushed down against the biasing force of coil springs 20 of respective horn switches 19, respective horn switches 19 actuate the horn through contact between predetermined contact points.

Figure 3:
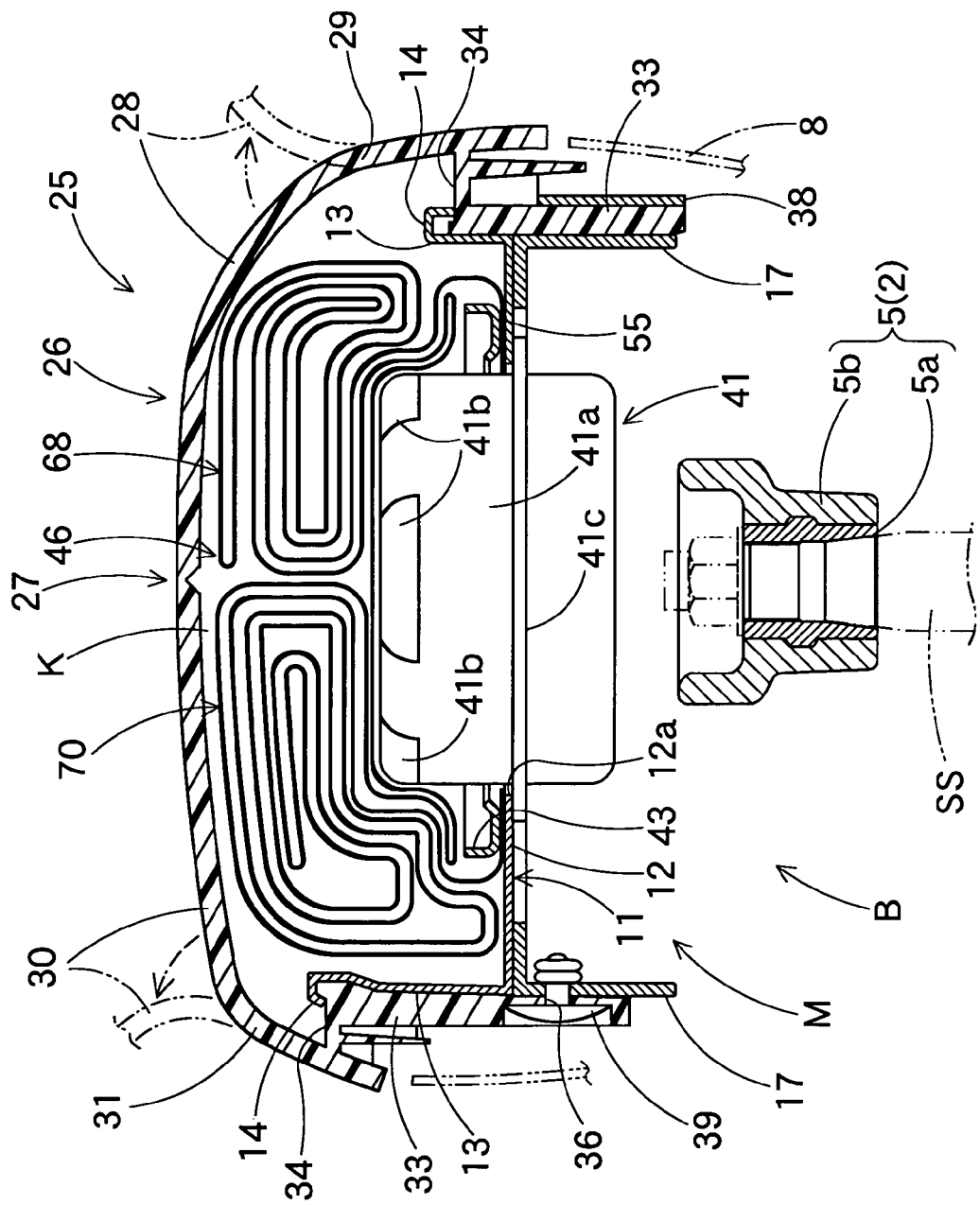
FIG. 3 is a schematic section view of the airbag device of the embodiment shown in FIG. 1, taken along line III-III of FIG. 1.

Furthermore, as shown in FIG. 3, holding strip parts 17 extending downward are bonded to bottom wall 12 of the bag holder 11 at predetermined positions. As shown in FIGS. 3 and 4, sidewall parts 33 of the pad 25 are riveted to the holding strip parts 17 and the sidewall parts 13 of the bag holder with rivets 39. The pad 25 is attached to and held to the bag holder 11 by riveting with the rivets 39 and latching of the latching claws 14 to the sidewall parts 33. At riveting with the rivets 39, backing plates 38 (see FIG. 3) disposed at predetermined regions are also used.

The pad 25 which functions as the airbag cover is formed from synthetic resin such as olefin-based or styrene-based, thermoplastic elastomer. As shown in FIGS. 1 to 5, the pad 25 is formed so that it extends to the surface of the cover layers 7 of respective spoke parts S. The pad 25 has a ceiling part 26 for covering the top side of the boss part B of the steering wheel W, pressing ribs 32, and sidewall parts 33. The pressing ribs 32 and the sidewall parts 33 project downward at a bottom side of the ceiling wall part 26. Door parts 28 and 30 are arranged in the ceiling wall part 26. The door parts 28 and 30 are pushed by the airbag 46 when expanding and thereby break the breakaway line 27 at the periphery of the door parts and open. The breakaway line 27 is formed by providing a concave groove at the bottom side of the ceiling wall part 26 and is disposed in an approximately H shape when it is seen from above. The door parts 28 and 30 are arranged so that their front-back direction boundary corresponds to the horizontal line of the "H" of the breakaway line 27 and use the regions between the respective ends of vertical lines of the "H" as hinge parts 29 and 31. Therefore, the door parts 28 and 30 open to the front and to the rear, respectively.

The sidewall part 33 of the pad is arranged in an approximately square tubular shape surrounding the sidewall part 13 of the bag holder 11. The sidewall part 33 has a latching groove 34 for latching the latching claws 14 arranged on the inner side of sidewall part 33. Furthermore, latching holes 35 in which are inserted latching projections 15 of the bag holder 11 are formed on the sidewall part 33 at a region on either side. Furthermore, as shown in FIGS. 3 and 4, attachment holes 36 are formed through predetermined positions in the sidewall part 33. The attachment holes 36 are for riveting the sidewall part 33 with the rivet 39 to the sidewall part 13 of the bag holder 11 or holding strip part 17.

The pressing ribs 32 are formed in an approximately cylindrical shape and are arranged so that they contact the top side of connecting wall parts 16 of the bag holder 11.

Figure 6:
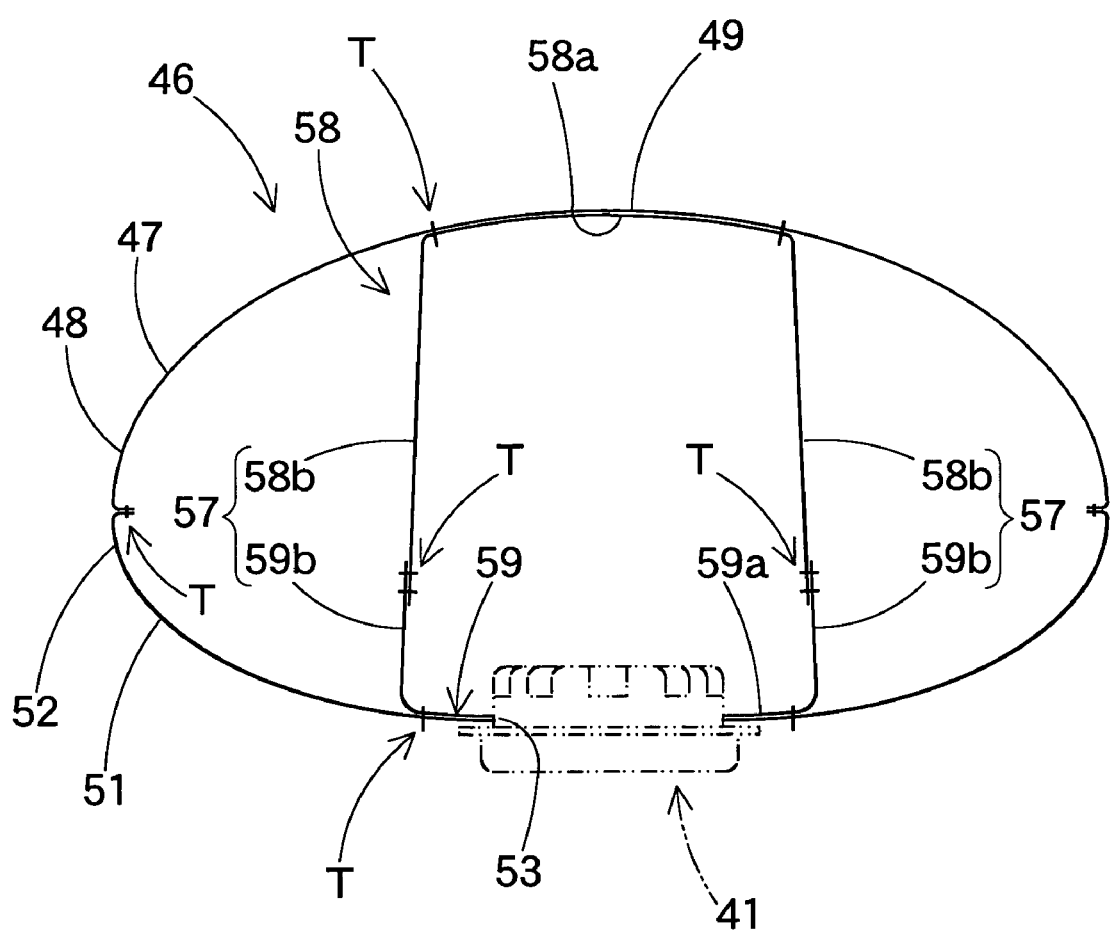
FIG. 6 is a vertical section view of an airbag used in the airbag device of the embodiment shown in FIG. 1, taken alone and expanded.
Figure 7:
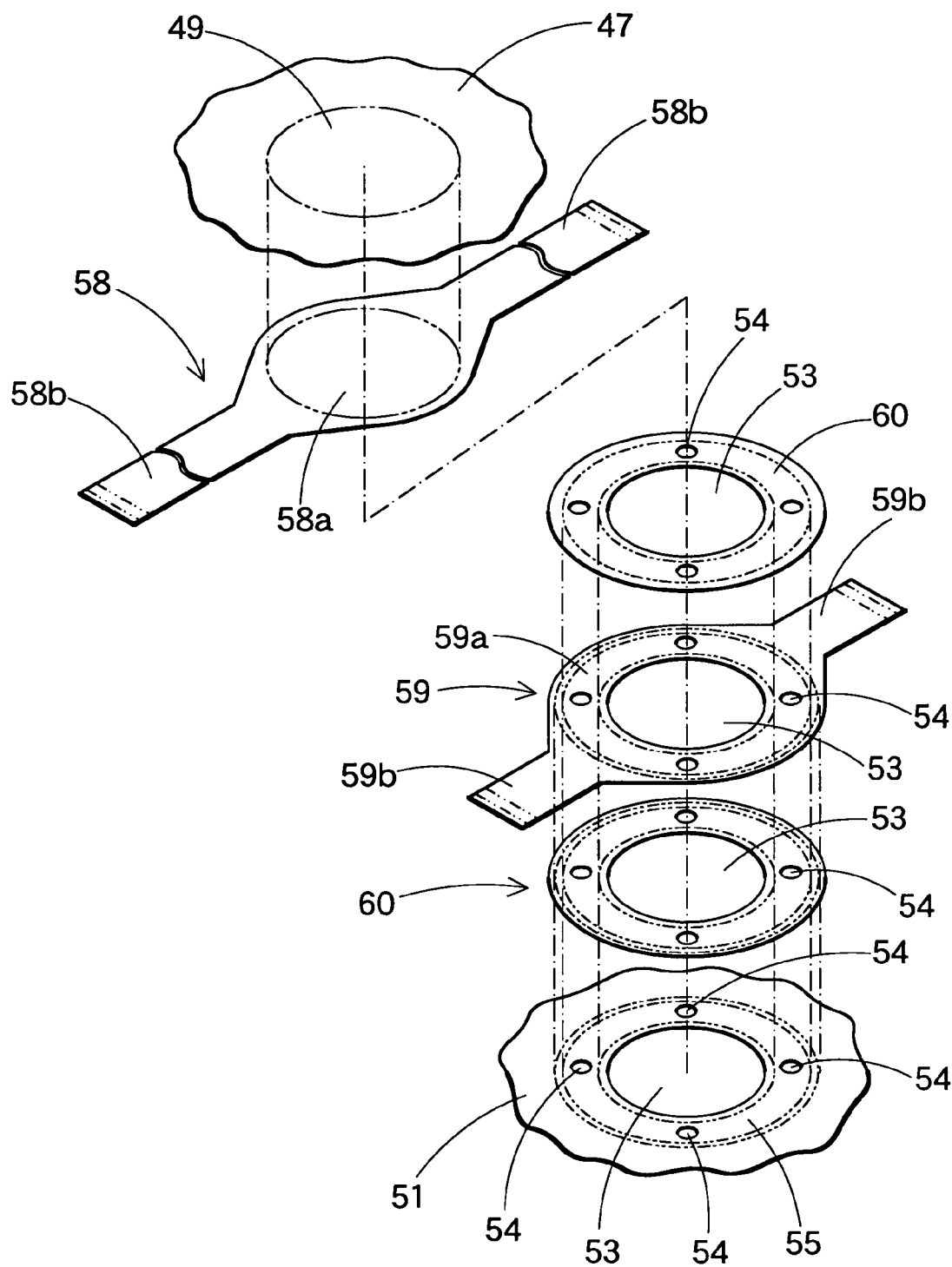
FIG. 7 is a partially exploded, perspective view of the airbag of the embodiment.
Figure 8:
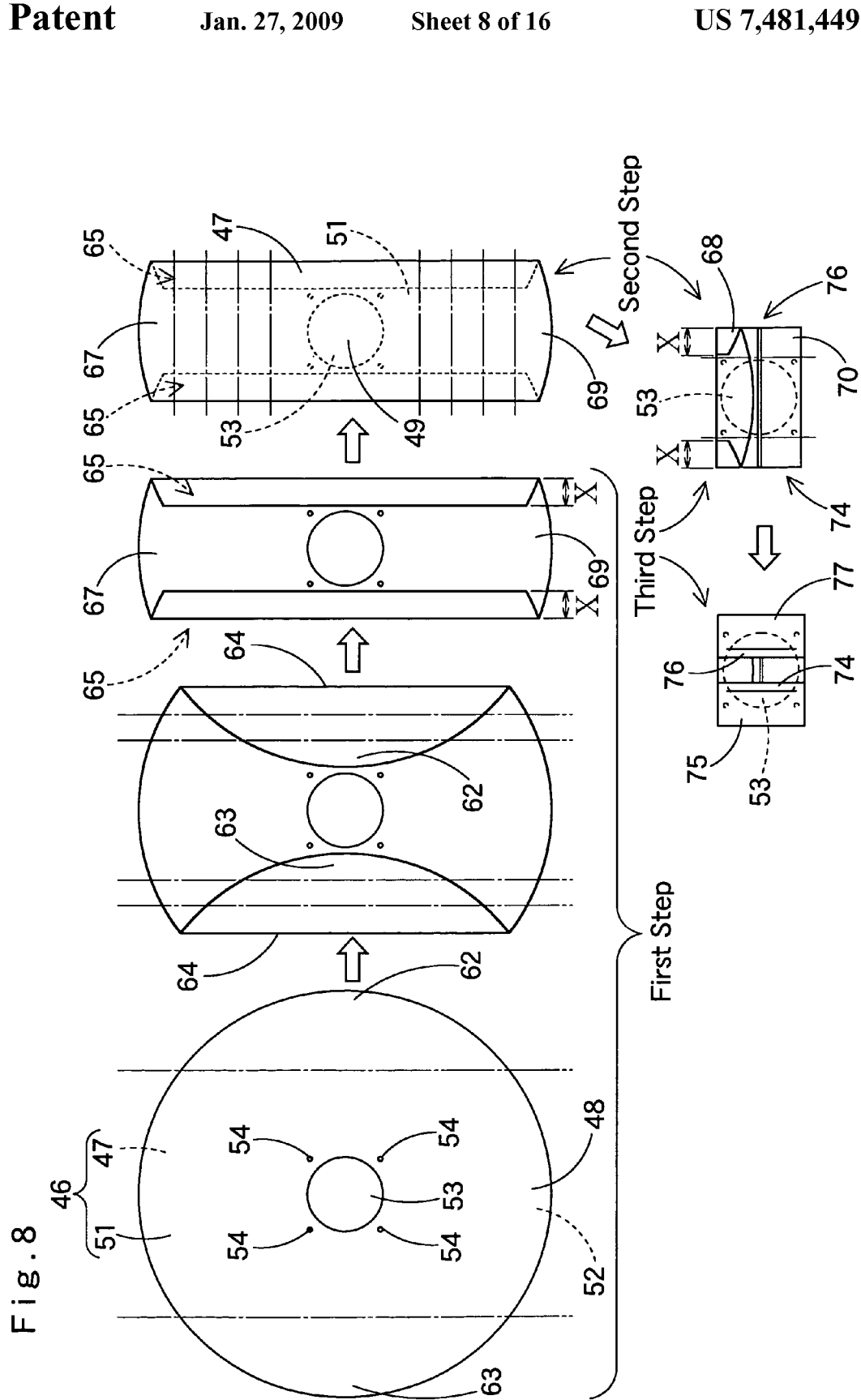
FIG. 8 is a view illustrating folding of the airbag of the embodiment.

As shown in FIGS. 6 to 8, the airbag 46 has a driver-side wall part 47 disposed at the top side toward the driver when completely expanded and a carbody-side wall part 51 disposed at the bottom side toward the steering wheel body 1. The wall parts 47 and 51 are each formed from woven fabric of polyester or polyamide and into a similar disk shape. The wall parts 47 and 51 form an outer circumference wall of the airbag 46 by sewing outer circumference edges 48 and 52 to each other. A gas opening 53 as a circular opening is arranged at the center of the carbody-side wall part 51. The main body 41a of the inflator 41 for supplying the expansion gas is inserted into the opening 53 from below. The circumference outer periphery of the opening 53 has attachment holes 54 formed therethrough in a vertical direction, which are made as an attachment region 55 to the bag holder 11 of the airbag 46. A not-shown vent hole through which surplus expansion gas can be exhausted is arranged in a predetermined region of the carbody-side wall part 51.

As shown in FIGS. 2 and 3, the attachment region 55 of the carbody-side wall part 51 is pressed by the retainer 43, and is thereby attached to the bottom wall part 12 of the bag holder 11. The retainer 43 is formed from approximately circular sheet metal, and has four bolts 43a. As shown in FIG. 5, respective bolts 43a of the retainer 43 are inserted into respective attachment holes 54. Respective bolts 43a are inserted through respective attachment holes 54 of the airbag 46, respective through-holes 12b of the bag holder 11, and respective through-holes 41d in the flange part 41c of the inflator 41, and then fixed with nuts 44. Thereby the inflator 41 is attached and fixed to the bottom wall part 12 of the bag holder 11 together with the airbag 46.

Tethers 57, 57 are arranged in the airbag 46. The tethers 57, 57 control separation between neighborhood of the center 49 of the driver-side wall part 47 and the gas opening 53 when expansion is completed. In the embodiment, the tethers 57, 57 are arranged at both the front and rear along the forward movement direction of the vehicle with the gas opening 53 as the center. Furthermore, respective tethers 57, 57 are formed by connecting band strips 58b and 59b, made from a tether cloth 58 and a reinforcement cloth 59, to each other. The tether cloth 58 is arranged by sewing its center part 58a to the inner surface of the center 49 of the driver-side wall part 47 of the airbag 46. From the front and rear sides of center part 58a, band strips 58b, 58b extend. The reinforcement cloth 59 is arranged by sewing a center part 59a to the inner surface of the periphery of the gas opening 53 in the carbody-side wall 51 of the airbag 46. From the front and rear sides of the center part 59a, band strips 59b, 59b are extended.

The reinforcement cloth 59 is arranged for reinforcing the periphery of the gas opening 53 together with another reinforcement cloth 60. The reinforcement cloths 59, 60 are provided with gas openings 53 and attachment holes 54. The gas openings 53 and the attachment holes 54 of the reinforcement cloths 59, 60 and the carbody-side wall part 51 are formed by sewing the reinforcement cloths 59, 60 to the carbody-side wall part 51 and then forming holes through both in one action.

Manufacture of the airbag 46 is described. First, the reinforcement cloths 59, 60 are sewed to a surface that will be the inner side of the carbody-side wall part 51 of the airbag 46, using suture thread T. Then, the openings 53 and the attachment holes 54 and also the not-shown vent hole are integrally opened in the carbody-side wall part 51. The center part 58a of the tether cloth 58 is sewed to the center 49 of the surface that will be the inner surface of the driver-side wall part 47 of the airbag 46, using the suture thread T. Furthermore, the driver-side wall part 47 and the carbody-side wall part 51 are overlapped with the sides that will be the outer surfaces contacting each other, and then the edges 48, 52 are sewed to each other using the suture thread T. Then, the airbag 46 is turned inside out using the gas opening 53 so that the sewing margin does not appear on the outer circumferential surface. Then, respective band strips 58b and 59b are drawn out from the gas opening 53 and then sewn to each other, and then put back into the airbag 46. Thus, the airbag 46 is manufactured.

Next, assembly of a driver's seat airbag device M is described. First, the retainer 43 is inserted into the airbag 46 using the gas opening 53, and then the airbag 46 is folded with respective bolts 43a being projected from respective attachment holes 54.

The folding of the airbag 46 is performed so that the carbody-side wall part 51 and the driver-side wall part 47 are overlapped and spread flat, and then folded so that widths between opposite edge portions with the gas opening 53 as the center are reduced. Thus, as shown in FIGS. 2, 3 and 5, the folding is performed so that the folded airbag 46 can be stored in a storing space K for the airbag 46 of the airbag device M, that is, the space between the sidewall parts 13, 33, and between the bottom wall part 12 of the bag holder 11 and the ceiling wall part 26 of the pad 25, and does not include the space taken up by the main body 41a inserted through the gas opening 53 of the inflator 41.

In the case of the embodiment, in the folding process for reducing the widths by bringing the outer edges close to the gas opening 53 shown in FIG. 8, the airbag 46 is folded in three steps: a first step, a second step for reducing a width in the direction perpendicular to the first step, and a third step in which the width is reduced in the same direction as in the first step.

In the case of the embodiment shown in FIGS. 8 and 9A to 9C, the first step is a folding step for reducing a width in a right and left direction. As shown in FIGS. 9A, B and C, the carbody-side wall part 51 and the driver-side wall part 47 are overlapped and spread flat, and then opposing edge portions with the gas opening 53 as the center (in the embodiment, two edge portions 62 and 63 in the right and left direction) are folded with the carbody-side wall 51 folded in so that the edge portions are brought close to the gas opening 53. The opposing edge portions are successively folded so that wound up portions 65 are formed. Here, the edge portions 62 and 63 are brought close to the gas opening 53 so that widths X remain to be folded in the third step. The wound region 65 in the embodiment is formed by roll folding. Specifically, first, the portions from the opening 53 to the right and left edge portions 62, 63 are folded into two with the folding lines 64 being at the middle of the respective portions and then are wound, bending in the carbody-side wall 51, starting from close to the folding lines 64, roll folding up close to the gas opening 53 side.

In the case of the embodiment, the second step is a folding step for reducing a width in a front and rear direction. As shown in FIGS. 8 and 10A, opposing edge portions with the gas opening 53 as the center (in the case of the embodiment, front and rear edge portions 67 and 69) are brought close to the gas opening 53 bending in the driver-side wall 47. Furthermore, the folding is performed so that repeatedly folded regions 68, 70 at the sides of the two edge portions 67 and 69 each cover approximately half of the gas opening 53. In other words, the airbag 46 which is folded so that a rear edge 68a and a front edge 70a are adjacent to each other when they are seen from above, are brought close to the center position in a front and rear direction of the opening 53 so that the edge portions contact each other.

In the case of the embodiment, the front side folding region 68 is folded bending in the driver-side wall 47 at a folding line provided between the gas opening 53 and the front edge 67. Then, with the folding line 71 as the edge, the airbag is wound up with the carbody-side wall 51 bending in (here called "folding-back roll folding"), and then folded in toward the driver-side wall 47, laying the wound portion on the driver-side wall 47. The rear side folding region 70 is subjected to roll folding in which the neighborhood of the rear edge is wound bending in the carbody-side wall part 51 (this is referred to as simple roll folding), and the wound portion is placed on the side of the driver-side wall 47.

Figure 11A:
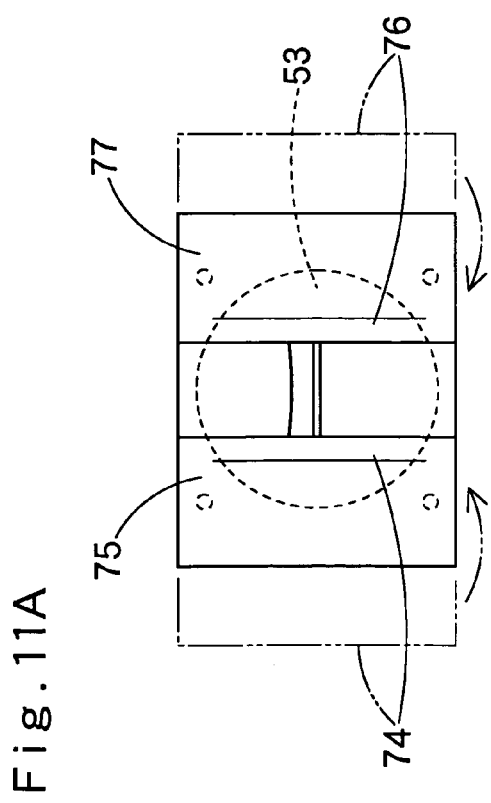
FIG. 11A is a view illustrating a third step of the folding of the airbag of the embodiment; and furthermore

In the case of the embodiment, the third step is a folding step for reducing the width in the right and left direction. As shown in FIGS. 8 and 11A, the folding is performed so that opposite edge portions with the gas opening 53 as the center, here sides of right and left edge portions 74 and 76, are disposed near opposite sides of the main body 41a of the inflator 41 inserted through the gas opening 53. More specifically, the left and right edge portions 74 and 76 are folded upward toward the driver-wide wall 47. In other words, portions 75 and 77, starting the edges 74 and 76 to the vicinity of left and right outer edges of the retainer 43, each generally having a width X (FIG. 10A), are bent upward toward the driver-side wall 47, as shown in FIG. 11A.

After the airbag 46 is folded through the first to third steps in this way, the folded airbag 46 is disposed on the bottom wall part 12 of the bag holder 11 so that bolts 43a are projected from the through-holes 12b.

After that, the pad 25 is put on, and the latching claws 14 of the bag holder 11 are latched in respective latching grooves 34 as the predetermined latching projections 15 are being inserted into the latching holes 35. Then, the sidewall parts 33 of the pad 25 are fixed with the rivets 39 to the sidewall parts 13 of the bag holder 11 and the holding strip parts 17 using with the backing plates 38.

After the airbag 46 is folded, if it is stored or conveyed before it is disposed on the bottom wall part 12 of the bag holder 11, it is acceptable that after the airbag 46 has been subjected to the third step of the folding process, the right-and-left bent regions 75 and 77 are folded on a region of the airbag 46 above the gas opening 53, and then the airbag 46 is held by a breakable wrapping material.

Then, the horn switches 19 are attached to the front and rear connecting strip parts 16, 16 on the right and left sides of the bag holder 11 together with the connecting plates 23 using the bolts 21. Then, the main body 41a of the inflator 41 is inserted into the airbag 46 through the gas opening 53 via the insertion hole 12a of the bag holder 11 (see FIG. 11C or FIG. 2), and the bolts 43a projecting from respective through-holes 12b of the bag holder 11 are inserted through respective through-holes 41d in the flange part 41c of the inflator 41. Then bolts 43a are fastened with the nuts 44. Thereby the inflator 41 is attached and fixed to the bottom wall part 12 of the bag holder 11 together with the airbag 46, and the airbag device M can be assembled.

Regarding the airbag device M assembled in this way, regions of the nuts 23a for respective connecting plates 23 are disposed at the attachment bases 6, 6 of the steering wheel body 1 that has been installed in the vehicle. Then, respective attachment bolts 9 are screwed into respective nuts 23a via the insertion holes 6a of the attachment bases 6, whereby the airbag device M can be attached to the steering wheel body 1. As a result, assembly of the steering wheel W is completed.

After that, when the expansion gas is discharged from the gas discharge port 41b of the inflator body part 41a, the airbag 46 expands, causing the breakaway line 27 in the pad ceiling wall part 26 to be broken and thus the door parts 28, 30 to be opened. The airbag thus projects greatly from the pad 25.

In the airbag device M of the embodiment, when the expansion gas is supplied from the inflator 41 into the stored airbag 46, the airbag 46 unfolds its folds, and spreads and expands in a reverse process to the folding process with the neighborhood of the center 49 of the driver-side wall part 47 facing the gas opening 53 being pushed up. Thus, in the initial stage of the expansion of the airbag 46, as shown in FIGS. 13A to 13D, the neighborhood of the center 49 of the driver-side wall part 47 puts pressure to open up the folding lines made in the second step through unfolding of the folds made in the third step.

Figure 11C:
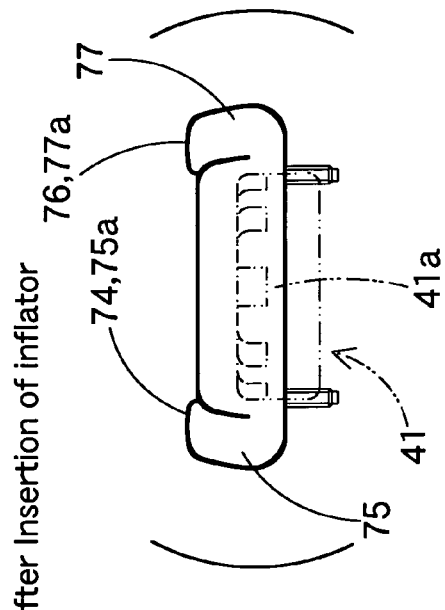
Figure 13A:
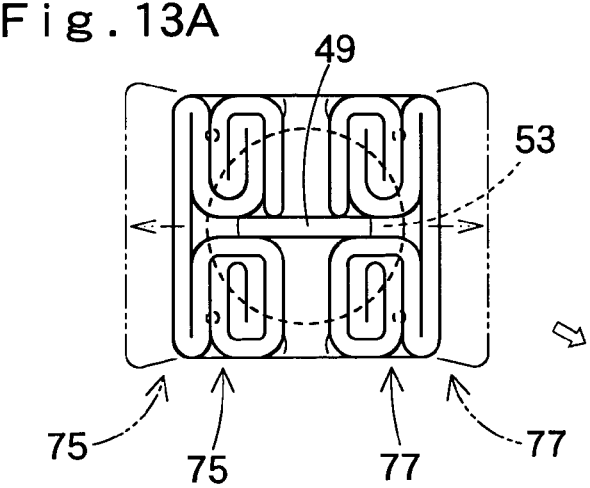
FIGS. 13A, 13B, 13C and 13D are schematic plan views for sequentially illustrating an initial stage of expansion in the airbag of the embodiment.
Figure 13B:
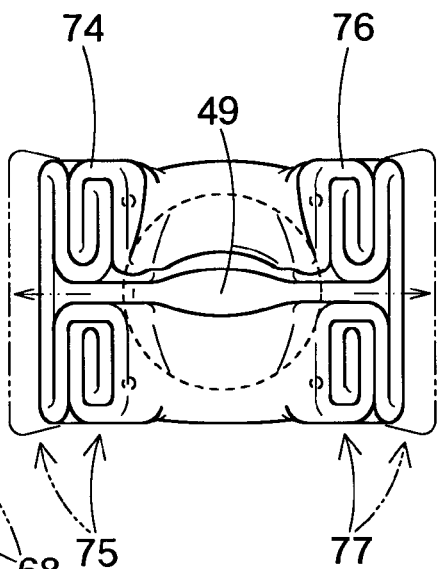

In the folding in the third step, as shown in FIG. 11C and FIG. 2, the sides of the opposing edge portions 74 and 76 with the gas opening 53 as the center are simply bent toward the driver-side wall 47 and disposed near the right and left sides of the body part 41a of the inflator 41 inserted through the gas opening 53, respectively, so that the bent regions 75 and 77 are formed. Therefore, in the unfolding of the folding done in the third step in the initial stage of the expansion of the airbag 46, as shown in FIGS. 13A, B and C, the folding is easily unfolded by stretching out the bent regions 75, 77, and the rise of the neighborhood of the center 49 of the driver-side wall part 47 is accelerated.

Figure 12A:
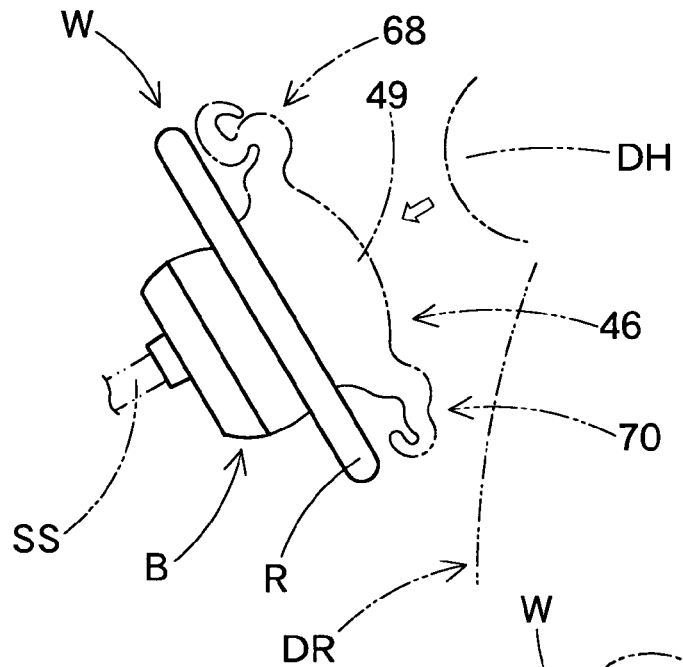
FIGS. 12A, 12B and 12C are views sequentially showing operation conditions of the airbag device of the embodiment.
Figure 13C:
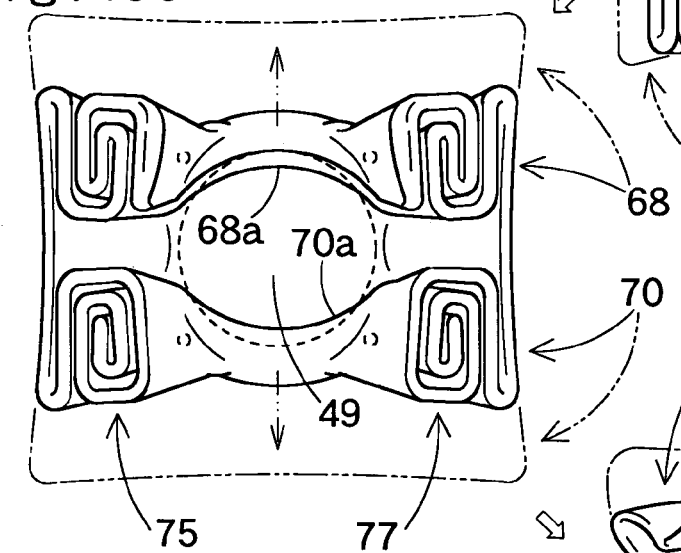
Figure 13D:
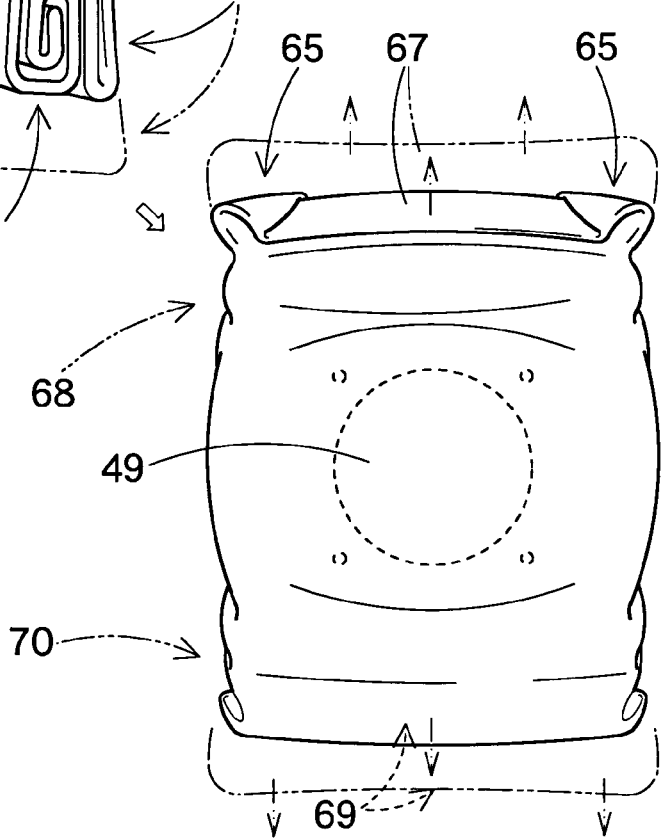

In the second step, as shown in FIG. 10A, the areas by the two edges 67 and 69 are folded so that they each cover approximately half of the gas opening 53 facing the driver-side wall 47, and in a way that the sides of the two edge portions 67 and 69 are brought close upward of the gas opening 53 from the front and rear, i.e., perpendicularly to the direction of the width reduced in the third step (first step). Therefore, if the folding of the third step is unfolded, as shown in FIGS. 13C and D, the portions 68a and 70a of the respective folded regions 68 and 70 at the sides of the two edge portions 67 and 69, which have been close to each other, are separated from each other, and the neighborhood of the center 49 of the driver-side wall part 47 is easy to project upward from a space between the edge portions 68a and 70a. Then, as shown in FIG. 13D and FIGS. 12A and B, the fold of the folding in the second step is quickly unfolded together with the push up of the neighborhood of the center 49 of the driver-side wall part 47.

In the folding in the first step, the sides of the two edge portions 62 and 64 in the predetermined direction (in the case of the embodiment, right and left) are folded with the wound regions 65, 65 being provided at the side of the carbody-side wall 51. Unfolding of the folds made in the first step is restricted by the wound regions 65, 65. Therefore, in the unfolding of the fold in the second step, the fold in the first step is not unfolded so that the unfolding of the fold in the second step is accelerated until the airbag is into a shape immediately before it is folded in the second step. As a result, in the unfolding of the fold in the second step, as shown in FIGS. 12A and B, the airbag 46 expands so that it spreads and expands into the shape immediately before it is folded in the second step with the neighborhood of the center 49 of the driver-side wall part 47 being projected upward, or widely spreads along the direction in which the width was reduced in the second step (in the embodiment, the front/rear direction). Naturally, at that time, since the unfolding of the folding in the first step is restricted, the neighborhood of the center 49 of the driver-side wall part 47 does not excessively project toward the driver DR.

Figure 12B:
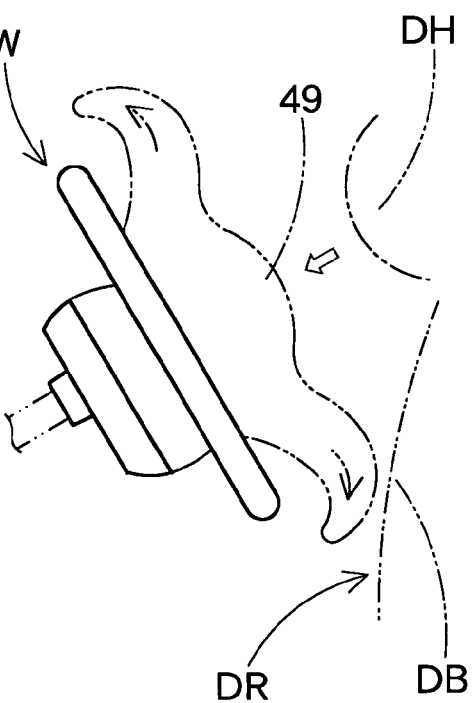

Then, after the initial stage of the expansion, as shown in FIGS. 12B and C, the unfolding of the fold folded in the first step is performed, and the expansion of the airbag 46 is completed.

Accordingly, in the airbag device for the driver's seat M of the embodiment, in the initial stage of the expansion of the airbag 46, the neighborhood of the center 49 of the driver-side wall part 47 smoothly projects upward with the unfolding of the fold in the third step or the second step. Therefore, in the initial stage of the expansion, the airbag 46 can secure thickness of the neighborhood of the center 49, and as shown in FIGS. 12A and 12B, so that even if a neighborhood of the head DH of the driver DR enters the neighborhood of the center of the steering wheel W, the airbag 46 can smoothly expand to protect the neighborhood of the head DH of the driver DR.

Figure 12C:
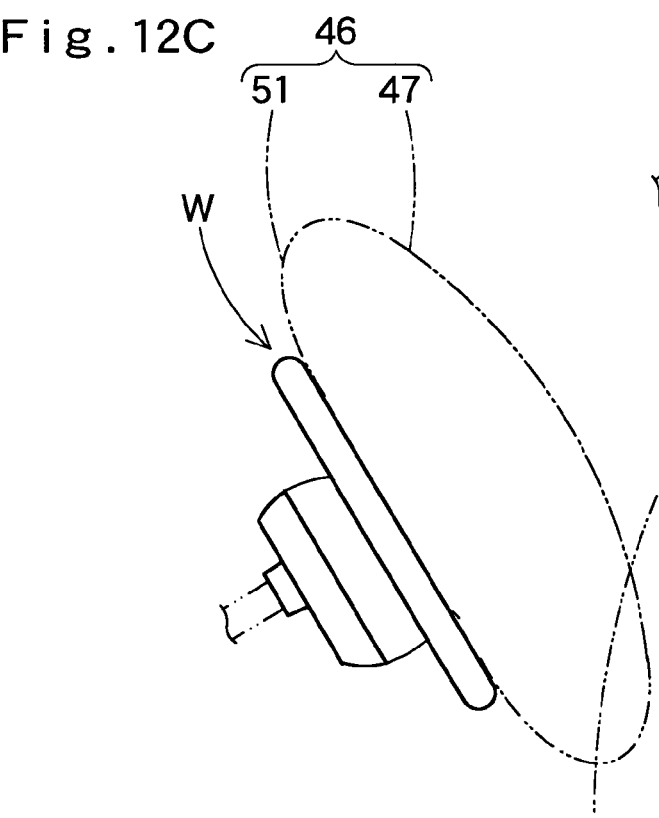

Furthermore, in the initial stage of the expansion, the airbag 46 expands widthwise along the width that was reduced in the second step. Therefore, if the reduction in the second step is made to be, for example, along the front/rear direction of the vehicle as in the embodiment, in the initial stage of the expansion of the airbag 46, although a width in the right and left direction is small, the airbag 46 can be spread and expanded long along the front and rear direction. As a result, even in the initial stage of the expansion, as shown in FIG. 12, the airbag 46 can easily protect regions of the head DH or the chest DB of the driver DR which are forwardly displaced, the regions arranged in the vertical direction (front and rear direction), securing a cushion effect.

Naturally, in the airbag device for the driver's seat M of the embodiment, after the driver-side and carbody-side wall parts 47 and 51 are overlapped flat on each other, the airbag 46 is folded in the first and third steps and the second step, wherein widths are reduced in directions perpendicular to each other. In the second step, the areas of the two edge portions 67 and 69 in the front and rear direction are folded close to the gas opening 53 so that they each cover approximately half of the gas opening 53, and in the next, i.e., third, step, the sides of the right and left edge portions 74 and 76 perpendicular to the direction of prior reduction of width are bent close to each other. The folding of the airbag 46 is completed in a manner that endfaces at the sides of the edge portions 74 and 76 are the sides of the top endfaces 75a and 77a. Therefore, in the embodiment, the airbag can be folded compactly in an approximately rectangular shape. As a result, in the airbag device for driver's seat M of the embodiment, the folded airbag 46 can be smoothly stored into the upper region by the boss B of the steering wheel W, in which the storing space K is limited in order to secure visibility of meters in the instrument panel.

Figure 11B:
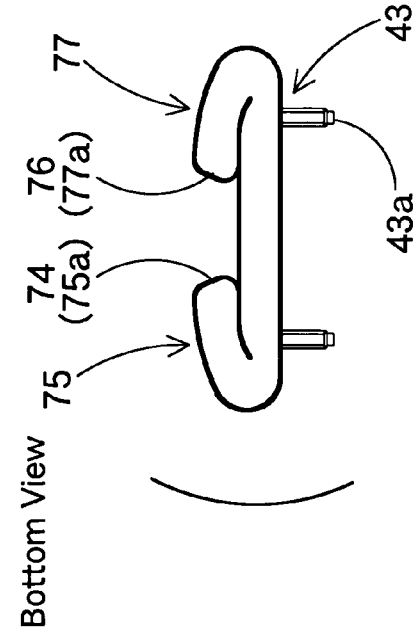
FIG. 11B is a bottom view of the folding of FIG. 11A.

Furthermore, in the airbag device for the driver's seat M in the embodiment, in the third process, the airbag 46 is folded such that the sides of the right and left, two opposing edge portions 74 and 76 with the gas opening as the center are bent upward toward the driver-side wall part 47 so that they are disposed near the right and left sides of the inflator 41 inserted through the gas opening 53. Thus, in the third step, the areas by the two edge portions 74 and 76 are folded so that the sides of the two edge portions 74, 76 are disposed on the side portions of the top endfaces 75a, 77a of the bent regions 75, 77, and the bent regions 75, 77 are disposed in a manner that the regions become vertical near the two sides of the inflator 41 when the inflator 41 is inserted. Therefore, in assembling of the airbag device M, the inflator 41 can be attached with as little disruption of the folding of the airbag 46 as possible. Thus, in the assembly of the airbag device M, first the airbag 46 that has been folded is disposed in a manner that it is attached to the bottom wall part 12 of the bag holder 11. Then the pad 25 as the airbag cover is put on. Then the inflator 41 is inserted into the airbag 46 through the gas opening 53 and attached to the bottom wall part 12 of the bag holder 11, and thus the airbag device M is assembled. At that time, as shown in FIG. 11B and FIG. 2, the body part 41a of the inflator 41 can be smoothly inserted between the bent regions 75, 77 which then extend in a vertical direction from the two edge portions 74, 76 in the third step, and as a result the airbag device M can be assembled with as little disruption of the folding configuration of the airbag 46 as possible. Additionally, even if the folding configuration of the airbag 46 is disrupted at the insertion of the inflator 41 into the gas opening 53, that the inflator 41 pushes up the neighborhood of the center 49 of the driver-side wall part 47 upward when inserted. The aspect that it pushes up the neighborhood of the center 49 of the driver-side wall part 47 upward does not interfere with securing thickness near the center 49 of the driver-side wall part 47 in the initial stage of the expansion of the airbag 46. Thus, even if the folding configuration of the airbag 46 is disrupted at the insertion of the inflator 41 into the gas opening 53, the effect of securing thickness near the center 49 of the driver-side wall part 47 can be ensured in the initial stage of the expansion of the airbag 46. Therefore, in the embodiment, management to prevent disruption of folds of the airbag in the assembly of the airbag device M can be reduced.

In other words, such a storing condition of the airbag 46 is a condition where the airbag 46 is stored in a manner that the bent regions 75, 77 extending over the driver-side wall part 47, as folded in the third step, are arranged so that they extend in a vertical direction between the door parts 28, 28 of the airbag cover 25 and the bottom wall part 12 of the bag holder 11, and are disposed on opposite sides of the main body 41a of the inflator 41.

In the folding process of the airbag 46, in the first step of the embodiment, a case that the areas by the edge portions 62, 63 were folded back, and the neighborhoods of the folding lines 64 were wound was shown. However, in the folding in the first step, the wound regions may be formed in any way as long as the unfolding of the folding in the first step is restricted during the unfolding of the folding in the second step. Therefore, as a modification of the first step, as shown in depiction in parentheses at a lower stage side of FIG. 9C, it is acceptable that the edge portions 62, 63 themselves of at right and left are wound so that the carbody-side wall 51 bends inward, and then are subjected to the roll folding. Thereby the winging regions 65, 65 are formed.

In the second step of the embodiment, the front folding region 68 was subjected to the folding-back roll folding, while the rear folding region 70 was subjected to the simple roll folding. However, in the second step, as long as the folding regions 68, 70 each cover approximately half of the gas opening 53 in folding, various folding ways can be used. Therefore, as a modification of the second step, as shown in FIGS. 10B and 10C, one of the folding regions 68, 70 may be the folding region 72 subjected to the accordion-folding rising on the side of the driver-side wall 47. Alternatively, as a modification of the second step, the folding regions 68, 70 at the front and rear sides may be folded in the same folding way, for example, as shown in FIG. 10D, where the folding regions 68, 70 at the front and rear sides are subjected to the simple roll folding. Thus, in the folding in the second step, as long as the folding regions 68, 70 can each cover approximately half the upside of the gas opening 53, the front and rear folding regions 68, 70 may be folded in an adequate folding way including the folding-back roll folding, simple roll folding, or accordion-folding respectively.

Furthermore, in the embodiment, in the folding process of the airbag 46, the direction of reducing a width of the airbag 46 in the second step was along the front and rear direction of the vehicle. However, the airbag 46 may be folded in a way that the direction in reducing a width of the airbag 46 in the second step is along the right and left direction of the vehicle, while the direction in reducing a width of the airbag 46 in the first and third steps is along the front and rear direction of the vehicle.

Furthermore, focusing attention on a point that the airbag is folded such that certain widths are left to be folded in a final step thereafter, in the first step, and then the remaining portions are folded back to finish the folding step, it will also be appreciated to fold the airbag leaving widths to be folded back in the final step, in the second step, as well as in the first step. That is, the airbag is folded, before being housed on top of the boss, in three steps: a first step, a second step for reducing a width in a direction perpendicular to the first step, and a final step in which the widths are reduced in the same direction as in the first step and second step.

Figure 14:
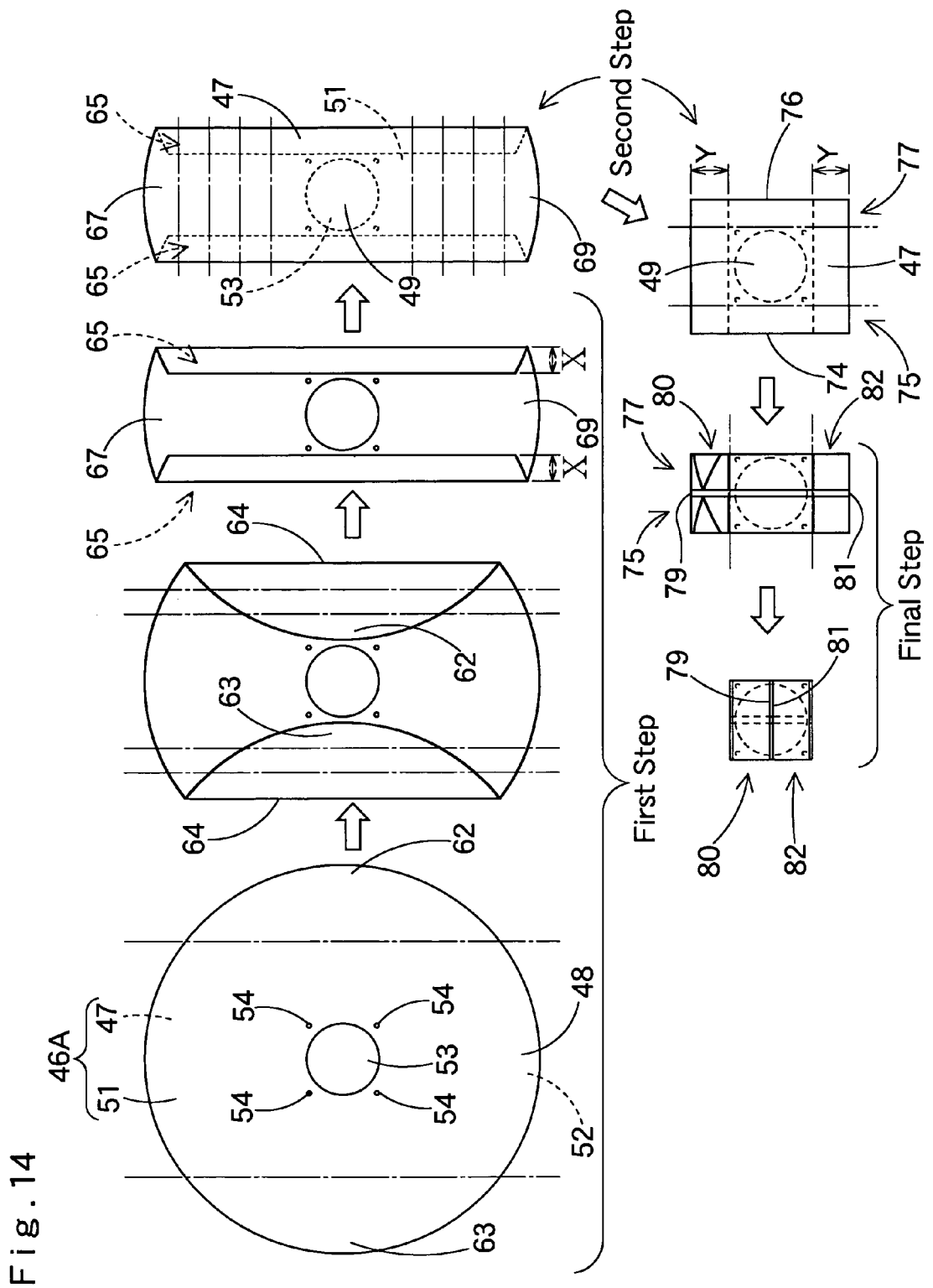
FIG. 14 illustrates another folding method of the airbag.

More specifically, the first step is to reduce a width in a right and left direction, as shown in FIG. 14. Similar to what is shown in FIG. 9, the carbody-side wall part 51 and the driver-side wall part 47 are overlapped and spread flat, and then opposing edge portions with the gas opening 53 as the center, or right and left edge portions 62 and 63, in the illustrated embodiment, are folded toward the carbody-side wall 51 so that the edge portions are brought close to the gas opening 53, thereby providing wound-up portions 65. At this time, the edge portions 62 and 63 are brought close to the gas opening 53 so that widths X remain unfolded to be folded in the final step. The wound-up regions 65 in the illustrated embodiment is formed by roll folding (folding-back roll folding), similar to what is shown in FIG. 9. However, the wound-up portions 65 may be of simple roll folding. Incidentally, an airbag 46A shown in FIG. 14 is the same as the airbag 46.

Figure 15:
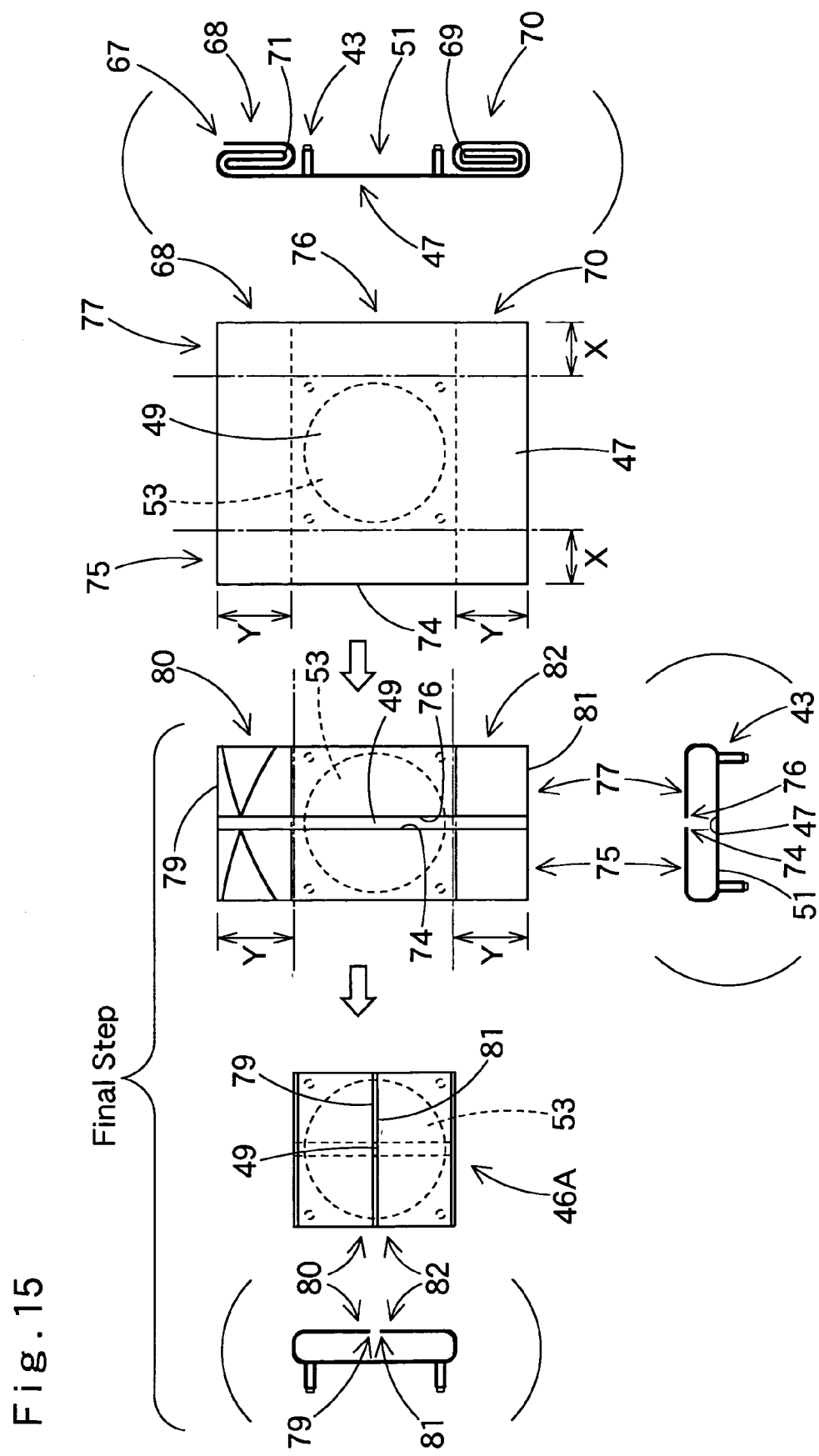
FIG. 15 illustrates a second step and a final step of the folding method of FIG. 14, in order.

In the illustrated embodiment, the second step is to reduce a width of the airbag in a front and rear direction. As shown in FIGS. 14 and 15, opposing edge portions with the gas opening 53 as the center, or front and rear edge portions 67 and 69, are brought close to the gas opening 53 on the carbody-side wall 51. At this time, in the second step, too, the edge portions 67 and 69 are brought close to the gas opening 53 so that widths Y are left unfolded to be folded in the final step. In the illustrated embodiment, generally similar to what is shown in FIG. 10, a front side region 68 is once folded back on a fold 71 from a front edge 67, on the driver-side wall 47 in a range between the gas opening 53 and the front edge 67, and then roll-folded on the carbody-side wall 51 from the vicinity of the fold 71. That is, the front region 68 is folded by folding-back roll folding. A rear side folding region 70 is subjected to simple roll folding from its leading end or a rear edge 69, on the carbody-side wall 51.

The final step consists of two stages: a stage to reduce an airbag width in left-right direction, and a stage to reduce an airbag width in front-rear direction. As shown in FIGS. 14 and 15, opposing edges of the airbag having the gas opening 53 in the center, or left and right edges 74 and 76 are folded to be disposed near opposite sides of the main body 41a of the inflator 41 inserted through the gas opening 53. That is, the left and right edges 74 and 76 are folded upward toward the driver-wide wall 47. In other words, portions 75 and 77 starting at the edges 74 and 76 to the vicinity of left and right outer edges of the retainer 43, each generally having a width X, as shown in FIG. 14, are bent upward toward the driver-side wall 47. Subsequently, portions 80 and 82 starting at the front and rear edges 79 and 81 to the vicinity of front and rear outer edges of the retainer 43, each generally having a width Y, as shown in FIG. 14, are bent upward toward the driver-side wall 47.

After the airbag 46A is folded up through these three steps, the airbag 46A is mounted on vehicle as the aforedescribed airbag 46.

In the airbag device M equipped by the airbag 46A, when the expansion gas is supplied from the inflator into the stored airbag 46A, the airbag 46A unfolds its folds, and spreads and expands in a reverse process to the folding process with the neighborhood of the center 49 of the driver-side wall part 47 facing the gas opening 53 being pushed up. Thus, in the initial stage of the expansion of the airbag 46A, as shown in FIGS. 16A to 16E, the neighborhood of the center 49 of the driver-side wall part 47 opens up the folds made in the final step, and then the folds made in the second step, while being pushed up.

Figure 16A:
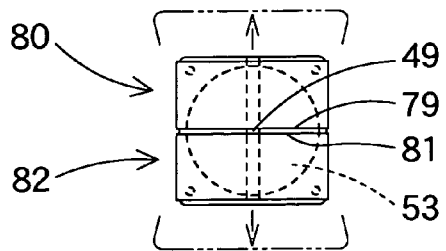
FIGS. 16A to 16E illustrate an initial stage of expansion of the airbag of FIG. 14 in order, by schematic plan views.
Figure 16B:
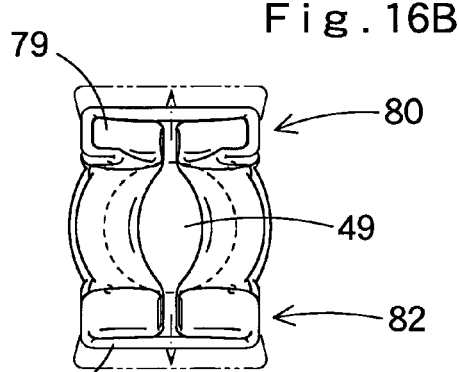
Figure 16C:
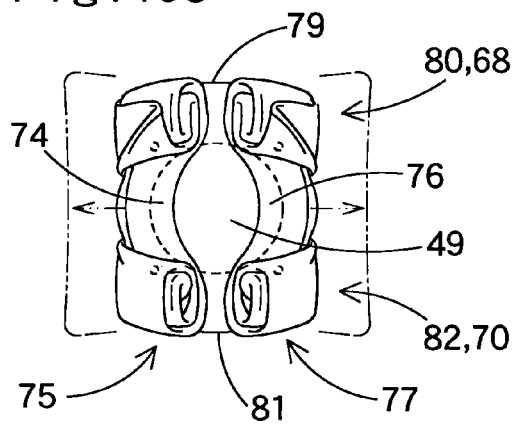
Figure 16D:
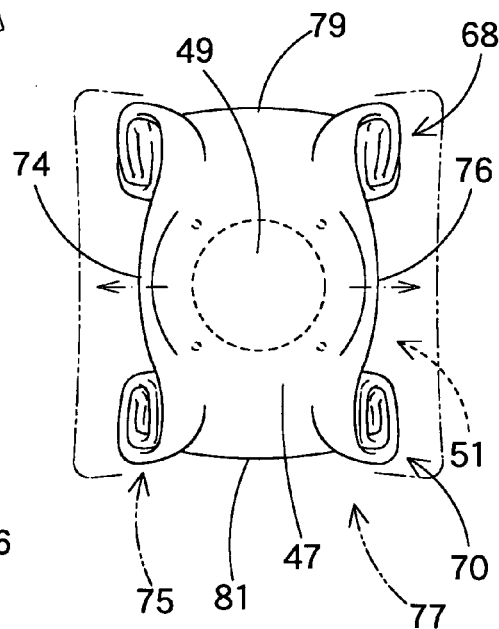

The folding in the final step is just each one fold of simply bending each of the portions 75 and 77 in the vicinity of the edges 74 and 76, and the portions 80 and 82 in the vicinity of the edges 79 and 81 upward toward the driver-side wall 47. Accordingly, as shown in 16A to 16C, the folding is easily unfolded in such a manner as to stretch out the bent regions 75, 77, 80 and 82. Then the neighborhood of the center 49 of the driver-side wall part 47 easily rises upward since this portion is exposed in a generally square shape with the folded-up portions 68 and 70 made in the second step stayed on the carbody-side wall 51, as shown in FIGS. 16D and 16E.

In the second step, the areas by the two edges 67 and 69 are folded on the carbody-side wall 51 so as to be brought close to the gas opening 53 in a direction perpendicular to the direction of the width reduced in the first step. Moreover, the wound-up portions 65 are provided in the first step to restrain unfolding. Accordingly, in unfolding of the folds made in the second step, the folds made in the first step remain unfolded, and instead, unfolding of the folds made in the second step is accelerated until the airbag is formed into a shape right before it is folded in the second step.

Figure 16E:
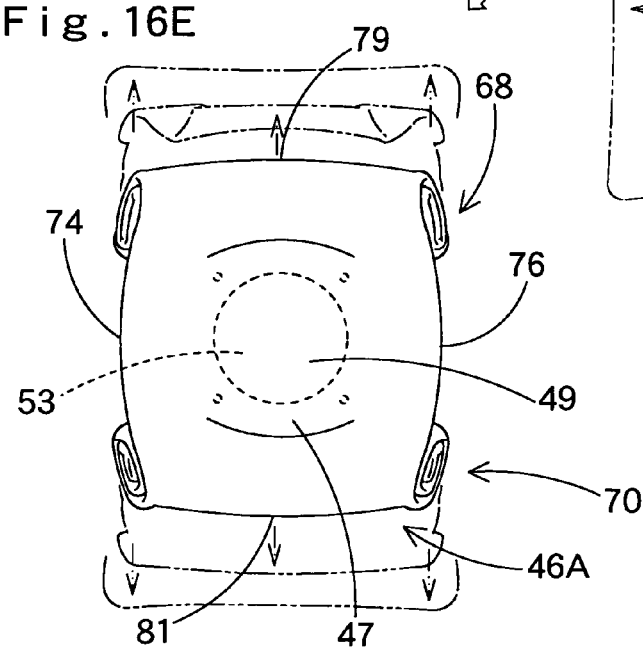

As a result, from a condition shown in FIG. 16E, the airbag 46A is formed into the shape right before it is folded in the second step while the neighborhood of the center 49 of the driver-side wall part 47 is being projected upward. That is, the airbag 46A widely expands along the direction in which the width was reduced in the second step. At this time, since the unfolding of the folds in the first step is restrained, the neighborhood of the center 49 of the driver-side wall part 47 does not excessively project toward the driver DR.

Then, after the initial stage of the expansion, or after the folds made in the second step are unfolded, the folds made in the first step are unfolded, so that the expansion of the airbag 46A is completed.

Accordingly, in the airbag device for the driver's seat M equipped by the airbag 46A, too, in the initial stage of expansion of the airbag 46A, the neighborhood of the center 49 of the driver-side wall part 47 smoothly projects upward along with the unfolding of the folds made in the final step or the second step. Therefore, in the initial stage of the expansion, since the airbag 46A secures enough thickness of the neighborhood of the center 49, even if a neighborhood of the head DH of the driver DR enters a neighborhood of the center of the steering wheel W, the airbag 46A smoothly protects the neighborhood of the driver's head DH.

In the folding method of the airbag 46A of leaving widths to be folded in the final steps, in the first and second steps, too, the front and rear regions 68 and 70 may be folded in an adequate folding way including folding-back roll folding, simple roll folding, or accordion-folding, in the second step.

Moreover, in the first step, the airbag 46A may be folded in an adequate folding method including accordion folding, other than folding-back roll folding or simple roll folding.

Furthermore, in the folding process of the airbag 46A, a direction of reducing an airbag width in the second step is the front and rear direction of the vehicle. However, it will also be appreciated that the airbag 46A is folded in a way that an airbag width is reduced in the right and left direction of the vehicle in the second step, and a width is reduced in the front and rear direction of the vehicle in the first step.

In addition, in the final step, it will also be appreciated to reduce a width of the airbag 46A in front-rear direction first, and then reduce width in left-right direction. This order of folding is the same as in the airbag 46.

Incidentally, widths X and Y left unfolded in the first and second steps of folding the airbags 46 and 46A are each generally half of a dimension of the generally annular retainer 43 between left and right, or front and rear outer edges, i.e., generally half of a transverse or longitudinal width of the retainer 43.

What is claimed is:

1. An airbag device for a driver's seat disposed at an upper part side of a steering wheel by a boss at the center, having,
    an airbag which is stored after being folded, and spreads and expands when expansion gas is supplied,
    an inflator for supplying the expansion gas into the airbag,
    a bag holder for holding the airbag that has been folded,
    and an airbag cover which covers the airbag that has been folded, and has a door part that opens by a push of the airbag when expanding; wherein,
    the airbag has a driver-side wall part disposed at the top side and a carbody-side wall part disposed at the bottom side when expansion is completed, each of the parts being in an approximately disk shape,
    and formed by coupling outer edges of the driver-side wall part and the carbody-side wall part to each other;
    the carbody-side wall part is in a configuration where a gas opening for inserting the inflator is disposed near the center, and the periphery of the gas opening is made as an attachment region to the bag holder;
    the airbag is configured to be stored in a manner that,
    the carbody-side wall part and the driver-side wall part are overlapped and spread flat, and folded so that airbag widths between opposite edge portions of the airbag with the gas opening as a center are reduced,
    and the airbag is configured to be stored in the upper part side by the boss through a folding process of three steps: a first step, a second step for reducing a width in a direction perpendicular to a direction in the first step, and a third step for reducing the width in the same direction as in the first step;
    the first step is a step in which the carbody-side wall part and the driver-side wall part are overlapped and spread flat, and opposing edge portions with the gas opening as the center are folded toward the carbody-side wall to be brought close to the gas opening, respectively, such that wound regions are provided and a folding allowance in each of the opposing edge portions remain unfolded to be folded in the third step;
    the second step is a step in which opposing edge portions with the gas opening as the center are folded toward the driver-side wall part to be brought close to the gas opening, respectively, and the folded regions by the two edge portions each cover approximately half the gas opening;
    and the third step is a step in which opposing edge portions with the gas opening as the center are folded in such a way to be bent upward toward the driver-side wall, so that bent regions are disposed near two sides of the inflator inserted through the gas opening.

2. The airbag device for a driver's seat according to claim 1,
    wherein the direction of reducing the width in the second step in the folding process of the airbag is along the front-rear direction of the vehicle.

3. The airbag device for a driver's seat according to claim 1,
    wherein the airbag is stored in a way that the bent regions bent upward toward the driver-side wall in the third step extend vertically between the airbag cover and the bag holder, and are disposed on opposite sides of the inflator.

4. The airbag device for a driver's seat according to claim 1,
    wherein the folding method in the first step in the folding process of the airbag is such that the carbody-side wall and the driver-side wall are overlapped and spread flat, and opposing edge portions with the gas opening as the center are folded back with the carbody-side wall folding inward, and then are wound up starting at the resulting folding lines.

5. The airbag device for a driver's seat according to claim 1,
    wherein the folding method in the first step in the folding process of the airbag is such that the carbody-side wall part and the driver-side wall part are overlapped and spread flat, and the opposing edge portions with the gas opening as the center are subjected to roll folding with the carbody-side wall bending inward and then folded up.

6. The airbag device for a driver's seat according to claim 1,
    wherein at least one of the folded regions that covers approximately half the gas opening in the second step of the folding of the airbag is folded according to either one of following three methods:
    one of the opposing edge portions with the gas opening as the center is folded with the driver-side wall folding inward on a fold line provided between the gas opening and the edge portion, and then is folded with the carbody-side wall part bending inward from a neighborhood of the fold line, and then folded and placed on the driver-side wall part;
    one of the opposing edge portions with the gas opening as the center is rolled with the carbody-side wall part bending inward, and then is folded and placed on the driver-side wall part;
    or one of the opposing edge portions with the gas opening as the center is folded by accordion folding on the side of the carbody-side wall part.

7. The airbag device for a driver's seat according to claim 6,
    wherein the folded regions that each cover approximately half the gas opening in the folding of the airbag in the second step are folded in different ways.

8. The airbag device for a driver's seat according to claim 6, wherein the folded regions that each cover approximately half the gas opening in the folding of the airbag in the second step are folded in the same way.

9. An airbag device for a driver's seat disposed at an upper part side of a steering wheel by a boss at the center, having,
    an airbag which is stored after being folded, and spreads and expands when expansion gas is supplied,
    an inflator for supplying the expansion gas into the airbag,
    a bag holder for holding the airbag that has been folded,
    and an airbag cover which covers the airbag that has been folded, and has a door part that opens by a push of the airbag when expanding; wherein,
    the airbag has a driver-side wall part disposed at the top side and a carbody-side wall part disposed at the bottom side when expansion is completed, each of the parts being in an approximately disk shape,
    and formed by coupling outer edges of the driver-side wall part and the carbody-side wall part to each other;
    the carbody-side wall part is in a configuration where a gas opening for inserting the inflator is disposed near the center, and the periphery of the gas opening is made as an attachment region to the bag holder;
    the airbag is configured to be stored in a manner that,
    the carbody-side wall part and the driver-side wall part are overlapped and spread flat, and folded so that airbag widths between opposite edge portions of the airbag with the gas opening as a center are reduced,
    and the airbag is configured to be stored in the upper side by the boss through a folding process of three steps: a first step, a second step for reducing a width in a direction perpendicular to a direction in the first step, and a final step for reducing airbag widths in the same direction as in the first and second step;
    the first step is a step in which the carbody-side wall part and the driver-side wall part are overlapped and spread flat, and opposing edge portions with the gas opening as the center are folded toward the carbody-side wall to be brought close to the gas opening, respectively, such that a folding allowance is left unfolded in each of opposing edge portions to be folded in the final step;
    the second step is a step in which opposing edge portions with the gas opening as the center are folded toward the carbody-side wall part to be brought close to the gas opening, respectively, such that a folding allowance is left unfolded in each of opposing edge portions to be folded in the final step;
    and the final step is a step in which portions left unfolded in the first and second steps are folded in such a way as to be bent upward toward the driver-side wall part.

* * * * *